United States Patent [19]

Davis et al.

[11] 4,167,150
[45] Sep. 11, 1979

[54] SHEET METAL RIBBON COATING APPARATUS

[75] Inventors: Bernard H. Davis, Stoney Creek, Canada; Thomas M. Welsh, Connersville, Ind.

[73] Assignee: H. H. Robertson Company, Pittsburgh, Pa.

[21] Appl. No.: 857,678

[22] Filed: Dec. 5, 1977

[51] Int. Cl.² .......................... B05C 1/08; B05C 13/00
[52] U.S. Cl. ......................................... 118/33; 118/42; 118/235; 226/92; 226/118
[58] Field of Search ................... 226/92, 118, 91, 119, 226/12, 116; 34/120; 118/235, 6, 33, 42

[56] References Cited

U.S. PATENT DOCUMENTS

| 2,338,143 | 1/1944 | Taylerson | 226/118 |
| 2,907,565 | 10/1959 | Sauter | 226/118 X |
| 2,980,411 | 4/1961 | Buckholdt | 226/91 |
| 3,240,411 | 3/1966 | Zarleng | 226/118 X |
| 3,346,159 | 10/1967 | Winkler | 226/92 |

*Primary Examiner*—John P. McIntosh
*Attorney, Agent, or Firm*—Harry B. Keck; George E. Manias

[57] ABSTRACT

Coating apparatus wherein a pretreated sheet metal ribbon passes from a supply coil successively through entry rolls, coating rolls, a curing oven, cooling apparatus, and tension rolls to a recoiler. The ribbon extends through the coating rolls and the curing oven as a long-span catenary. No looping facility is required. The apparatus incorporates novel leading end gripper means and trailing end gripper means for establishing and terminating the catenary in a manner which minimizes the unusable length of ribbon, that is, the uncoated leading end and uncoated trailing end of the processed ribbon. A method of initiating, maintaining, and terminating the catenary is disclosed.

21 Claims, 25 Drawing Figures

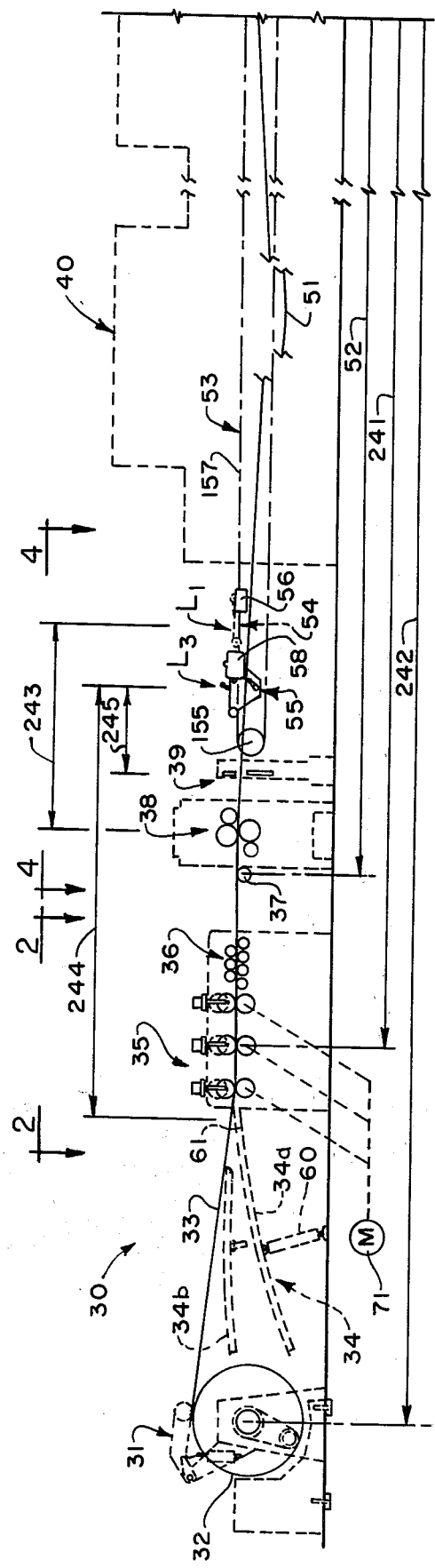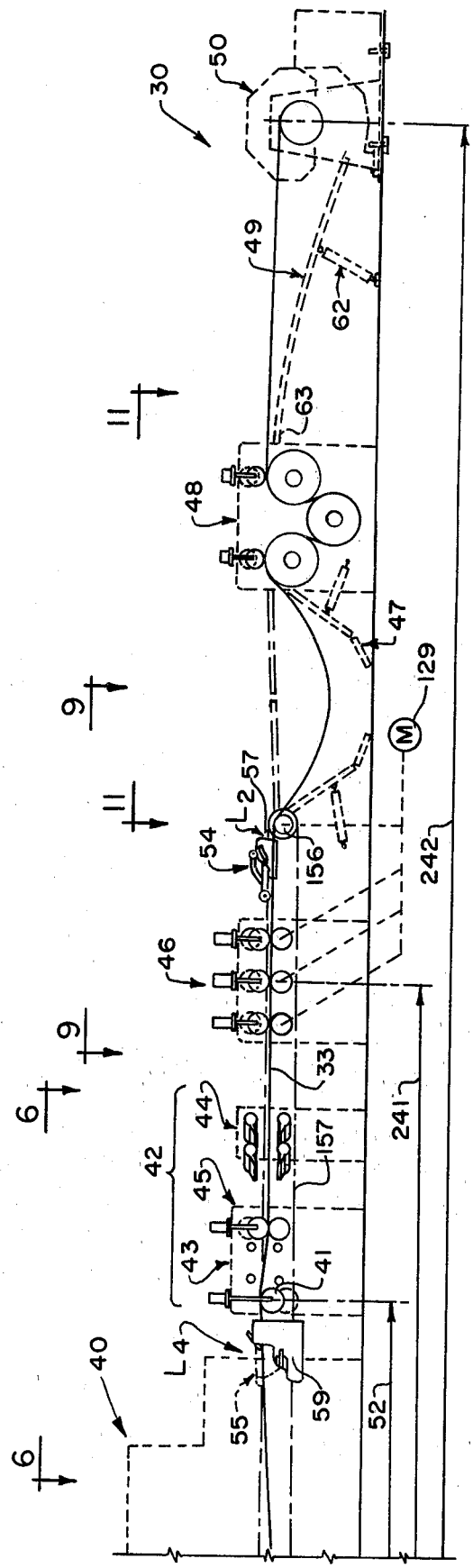
Fig. 1A
Fig. 1B

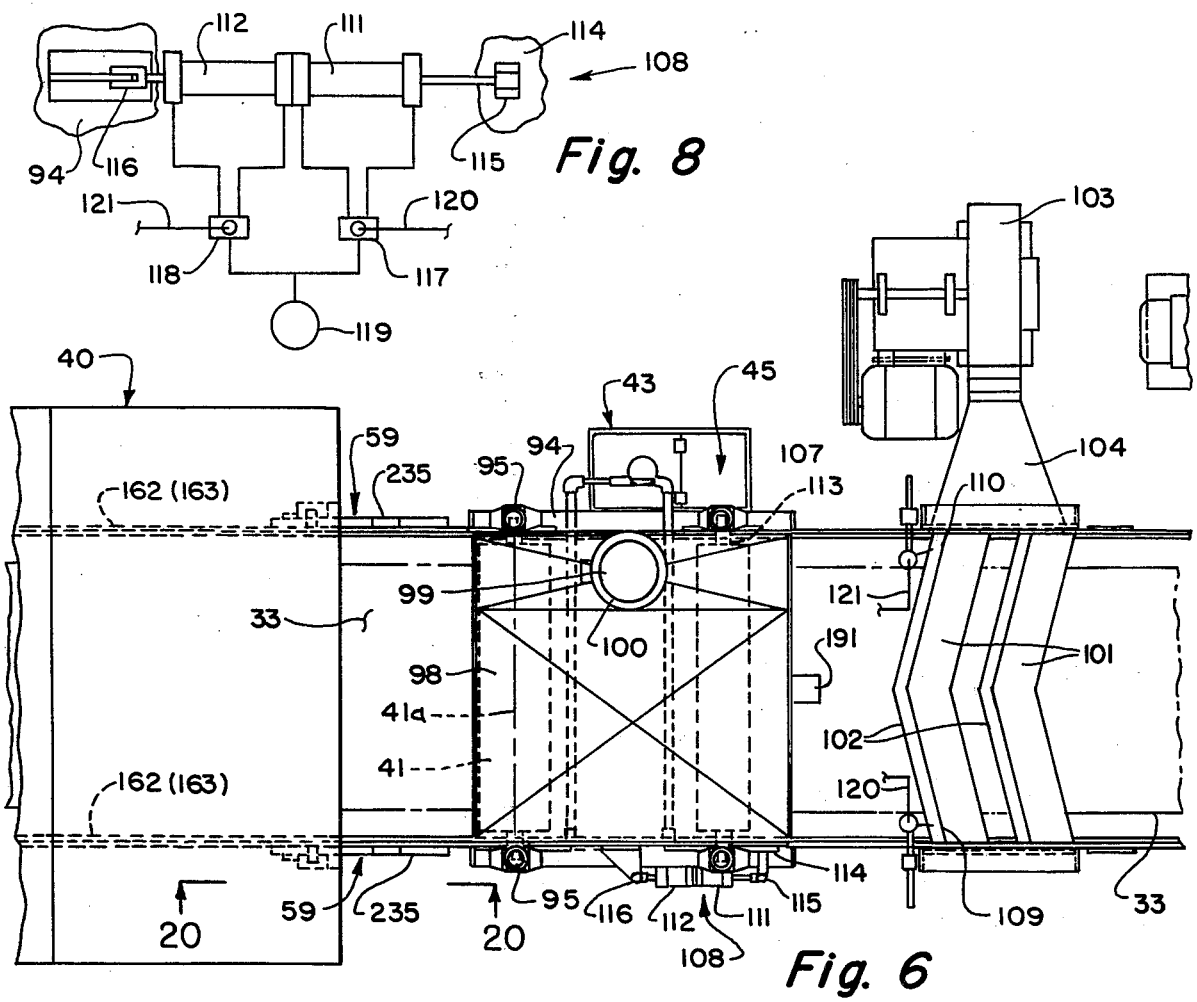
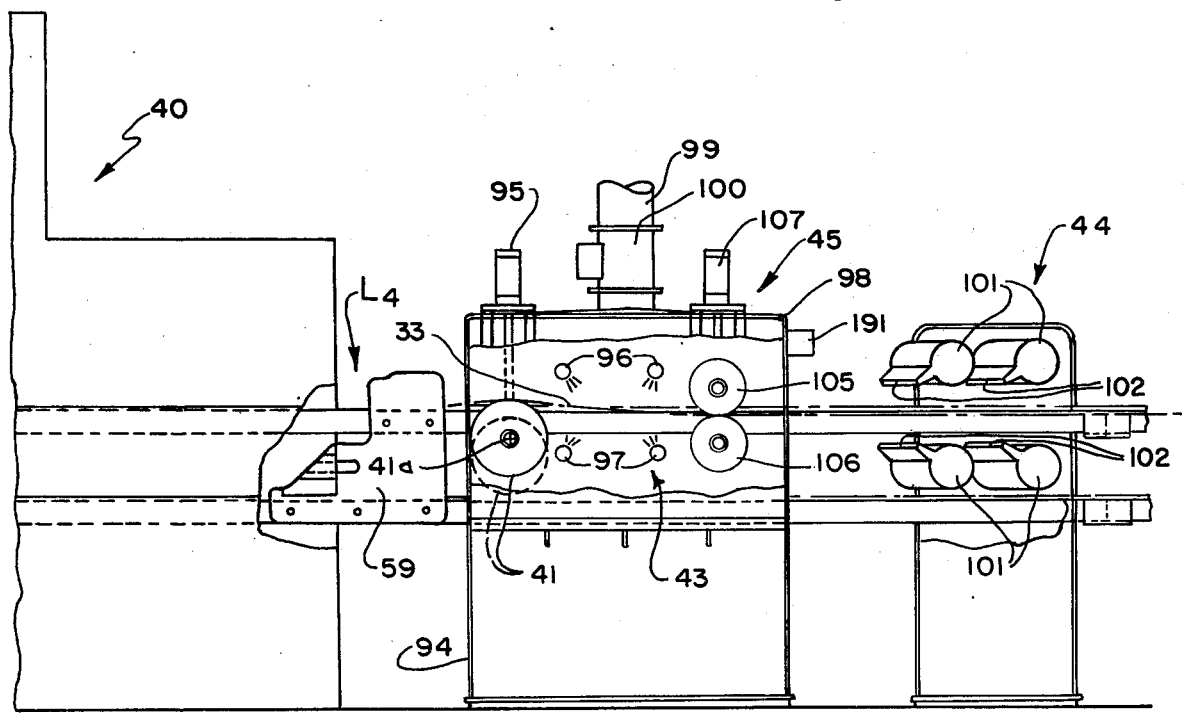

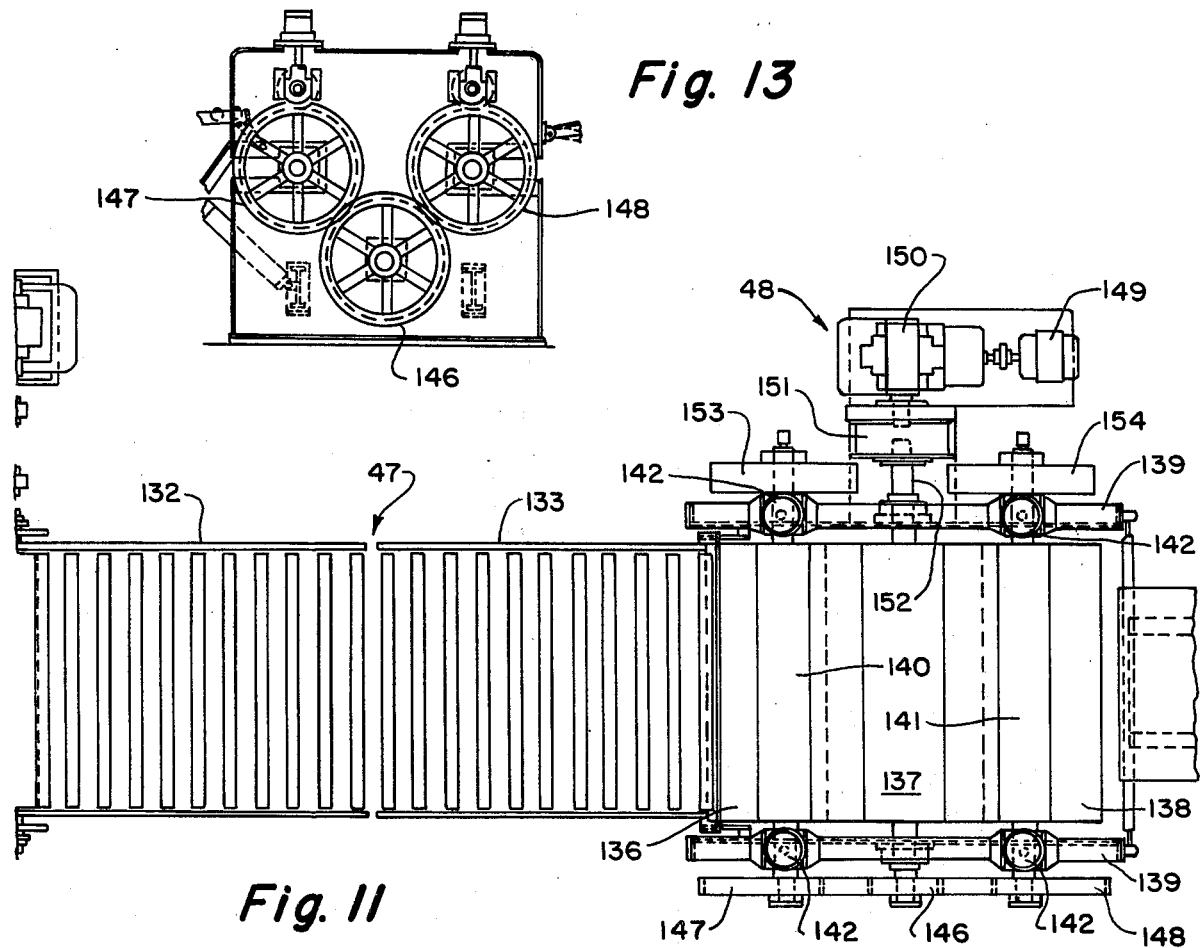

SHEET METAL RIBBON COATING APPARATUS

BACKGROUND OF THE INVENTION

1. Field of the Invention

This invention relates to sheet metal ribbon coating apparatus and method.

2. Description of the Prior Art

Sheet metal ribbon coating apparatus is known in the art. One such apparatus incorporates a looping facility which stores an appropriate length of the sheet metal ribbon for later processing. That is, when the trailing end of a first coil is reached, the stored ribbon within the looping facility is processed while, simultaneously, the trailing end of the first coil is stitched or otherwise secured to the leading end of a second coil. The use of a looping facility provides for the introduction of an endless sheet metal ribbon and therefore permits continuous operation of the apparatus. The initial purchase of the looping facility and the associated stitching or securing device and their continuous maintenance add significantly to the cost of coating the sheet metal ribbon.

A second apparatus is known which does not incorporate a looping facility. Instead, the leading end of the coil is manually threaded through the entire length of the apparatus and is connected to the recoiler and then the process is started. Such apparatus provides discontinuous operation. The disadvantage of such apparatus is the large amount of waste ribbon produced thereby. That is, initially the length of ribbon extending from the coating rolls to the recoiler is not coated and therefore is unusable.

SUMMARY OF THE INVENTION

The principal object of this invention is to provide improved apparatus for coating pretreated sheet metal ribbon.

Another object of this invention is to provide apparatus for coating a sheet metal ribbon wherein the manner in which the uncoated sheet metal ribbon is introduced into the apparatus and the manner in which the coated sheet metal ribbon is withdrawn from the apparatus minimizes the length of unusable ribbon.

Still another object of this invention is to provide apparatus for coating a sheet metal ribbon wherein a catenary is established and terminated in the sheet metal ribbon by novel leading end gripper means and trailing end gripper means.

A further object of this invention is to provide sheet metal ribbon coating apparatus which avoids undue bending of the coated sheets thereby avoiding stresses which materially affect the quality of the applied coating.

A still further object of this invention is to provide a novel method of initiating, maintaining, and terminating a long-span catenary in a sheet metal ribbon.

Broadly in accordance with the present invention, improved apparatus is provided for threading a sheet metal ribbon along a pass line extending from an uncoiling roll through at least one work station to a recoiling roll to establish and maintain a long-span catenary in the ribbon with significantly reduced waste at the leading end of the ribbon.

The present apparatus has three modes of operation including a threading mode, a running mode, and a tail-out mode. During the threading mode, the leading end of the ribbon is directed from an uncoiler to a first or leading end gripper means. During the running mode, the ribbon is processed while being impelled at a substantially constant speed through the apparatus to a recoiler. During the tail-out mode, the opposite or trailing end of the ribbon is gripped by a second or trailing end gripper means and is impelled at the substantially constant speed through the apparatus to the recoiler.

The present apparatus comprises in combination entry rolls positioned between the uncoiling roll and the work station, which are operable to impel the ribbon along the pass line toward the recoiling roll at a substantially constant speed, i.e., the line speed. A first ribbon ribbon support positioned between the entry rolls and the work station supports the ribbon at the trailing end of the catenary. A second ribbon ribbon support positioned beyond the work station supports the ribbon at the leading end of the catenary. Pairs of opposed tension rolls positioned beyond the second ribbon support are adapted to grip and pull the ribbon along the pass line. The tension rolls are arranged such that the nips thereof reside substantially in a common plane, whereby the sheet metal ribbon passing through the tension rolls remains flat and is not subjected to undue bending stresses.

To minimize the length of unusable ribbon at the leading end of the ribbon, first gripper means is provided at a first location adjacent to the first ribbon support, for gripping the leading end of the sheet metal ribbon. Transport means is provided which is operable to move the first gripper means and the leading end of the ribbon along the pass line at the same substantially constant speed, from the first location through the work station and between the tension rolls to a second location beyond the tension rolls. Motor means is provided, operable to urge the opposed tension rolls apart to permit passage of the first gripper means and the ribbon therebetween, and thereafter to urge the opposed tension rolls together thereby to apply gripping pressure to the ribbon after passage of the first gripper means. Release means is provided at the second location for disengaging the leading end of the ribbon from the first gripper means. The leading end of the ribbon is thereafter directed toward and connected to the recoiler. Drive means is provided which is operable during the threading mode to drive the entry rolls thereby to introduce the leading end of the ribbon into the first gripper means. Thereafter apparatus is operated in the running mode wherein the drive means drives the transport means and the tension rolls in interdependent relation with the entry rolls. That is, the entry rolls are driven at a substantially constant angular velocity while the transport means and the tension rolls are driven at a substantially constant torque. During the running mode, the entry rolls impel the ribbon toward the work station at the substantially constant speed. Simultaneously, the first gripper means, driven by the transport means at substantially constant torque, pulls the leading end of the ribbon through the work station until the gripper means passes between the tension rolls. The tension rolls then grip and pull the ribbon thereby establishing the catenary. The leading end of the ribbon is disengaged from the first gripper means and moves to the recoiler.

The present apparatus additionally includes means for terminating the long-span catenary with significantly reduced waste at a trailing end of the ribbon, comprising second gripper means for gripping a trailing end of the ribbon. The second gripper means is positioned between the first ribbon support and the first location of the first gripper means. The second gripper means is moved by the transport means along the pass line between a third location adjacent to the first location and a fourth location adjacent to the second ribbon support. Second release means provided at the fourth location disengages the opposite end of the ribbon from the second gripper means. The drive means is operable during the tail-out mode to drive the tension rolls and the transport means such that the second gripper means and the opposite end of the ribbon at the substantial constant speed through the work station to the fourth location, whereby as the catenary diminishes in length the tensile forces in the ribbon diminish to zero.

The phrase "trailing end" as used herein and in the claims is intended to refer either to the coil trailing end, i.e., the end of the sheet metal coil or to a mid-coil trailing end which is created by shearing the ribbon before all of the ribbon in the coil has been processed. Once the opposite end of the ribbon is released from the second gripper means, the ribbon continues to the recoiler. Shear means provided between the second gripper means and the first ribbon support may be used to sever the ribbon after the desired length of ribbon has been processed through the work station. The proximity of the shear means to the second gripper means minimizes the unusable length of mid-coil trailing end.

The present invention also provides a method of threading a sheet metal ribbon along a pass line extending from an uncoiling roll, over a first ribbon support, through at least one work station, over a second ribbon support to a recoiling roll to establish and maintain a long-span catenary in the ribbon with significantly reduced waste at the leading end of the ribbon. The present method comprises the steps of: impelling a leading end of the ribbon over the first ribbon support to a first location; gripping the leading end of the ribbon at the first location; impelling the ribbon over the ribbon support at the substantially constant speed while simultaneously pulling the leading end away from the first location at a substantially constant torque, through the work station, over the second ribbon support to a second location, the sheet metal ribbon being supported in the region between the first ribbon support and the second ribbon support and extending therebetween as a catenary; freeing the leading end of the ribbon at the second location; continuing to impel the ribbon over the first ribbon support at the substantially constant speed while simultaneously pulling the ribbon over the second ribbon support at a speed sufficient to maintain a preselected sag in the catenary; and recoiling the ribbon at a location beyond the second location. After a desired length of the ribbon is processed through the work station, the present method includes the steps of: gripping an opposite end of the ribbon at a position adjacent to the first location; simultaneously pulling the ribbon over the second ribbon support and moving the opposite end of the ribbon toward the second ribbon support at the substantially constant speed, whereby as the catenary diminishes in length the tensile forces in the ribbon diminish to zero; and freeing the opposite end of the ribbon.

The present apparatus and method find particular utility in a "strip-coating line" wherein a pretreated sheet metal ribbon is advanced through roller-coating means whereat a decorative coating is applied to either or both faces of the ribbon; through a curing oven in which the coating is baked or cured; and through coiling apparatus to a recoiler. The manner in which the ribbon is introduced into and withdrawn from the apparatus affords significant reductions in the length of unusable or waste ribbon, as compared to the waste ribbon produced by prior art strip-coating lines which do not incorporate a looping facility. For example, in the present line, the combined length of the leading end and coil trailing end may correspond to about one-third of the length of the catenary; and the combined length of the leading end and the mid-coil trailing end may correspond to about one-sixth of the length of the catenary.

BRIEF DESCRIPTION OF THE DRAWINGS

FIGS. 1A and 1B are elevation views which when placed in end-to-end relation schematically illustrate the apparatus of this invention;

FIG. 6 is a plan view as seen from the line 6—6 of FIG. 1B illustrating cooling apparatus including quench means and dryer means;

FIG. 7 is a side view of the apparatus of FIG. 6, with portions broken away to show detail;

FIG. 8 is a side view schematically illustrating steering control means;

FIG. 11 is a plan view as seen from the line 11—11 of FIG. 1B, illustrating collapsible bridge means and tension bridle means;

FIG. 12 is a side view of the apparatus of FIG. 11 with parts broken to show detail;

FIG. 13 is a side view, as seen from the line 13—13 of FIG. 12, further illustrating the tension bridle means;

DESCRIPTION OF THE PREFERRED EMBODIMENT(S)

Figure 2:
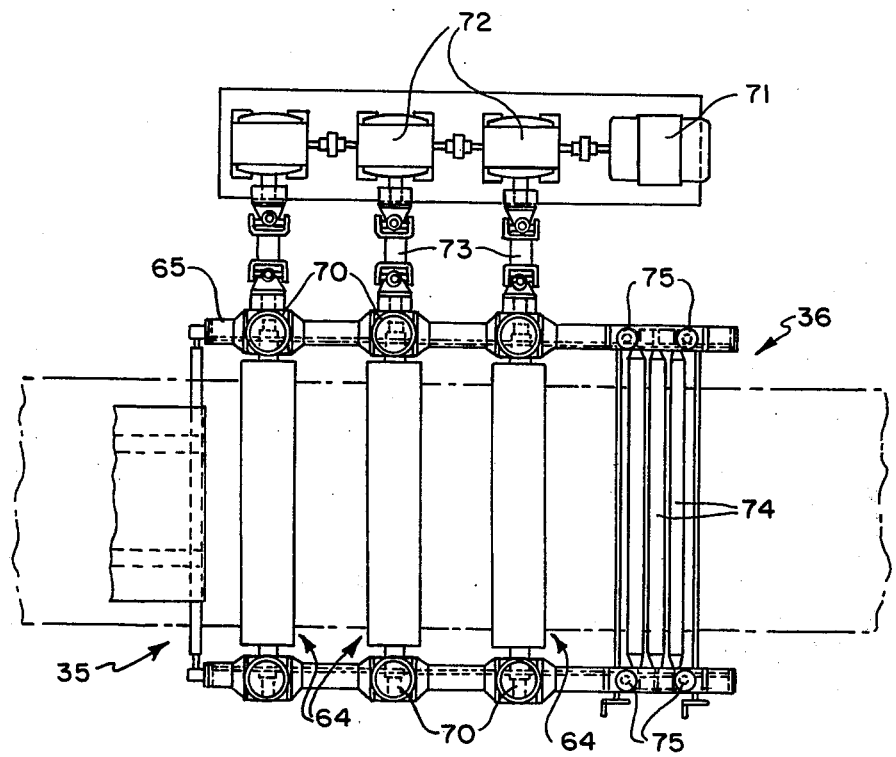
FIG. 2 is a plan view as seen from the line 2—2 of FIG. 1A, illustrating entry roll means and leveler means.

FIGS. 1A and 1B schematically illustrate the strip-coating apparatus 30 of this invention. In general, the apparatus 30 comprises a succession of elements including: an uncoiler 31 supporting a coil 32 of pretreated sheet metal ribbon 33; entry ramp means 34; entry roll means 35; leveler means 36; a first ribbon support 37; roller-coating means 38; sheer means 39; a curing oven 40; a second ribbon support 41; cooling means 42 including quench means 43 and dryer means 44; steering means 45; tension control means 46; collapsible bridge means 47; tension bridle means 48; exit ramp means 49; and a recoiler 50.

It will be observed that the ribbon 33 is unsupported in the region between the first and second ribbon supports 37, 41 and extends therebetween through the roller-coating means 38, the shear means 39, and the curing oven 40 as a catenary 51 having a length slightly greater than that indicated by the dimension line 52. The catenary 51 introduces tensile forces in the ribbon 33 which are restrained by the entry roll means 35 and the tension control means 46. The ribbon 33 also extends beyond the second ribbon support 41 through the quench means 43, the steering means 45, the dryer means 44, and the tension control means 46.

Normally, threading the ribbon 33 through the successive elements 38 to 46 inclusive would be an extremely difficult and time-consuming operation. This invention provides novel transport means 53 and first or leading end gripper means 54 operable during the running mode, for automatically threading the ribbon 33 through the sequential elements 40 to 46 and for simultaneously establishing the catenary 51.

It will be appreciated that terminating the operation of a strip-coating line which incorporates a relatively long catenary without at the same time producing a large amount of waste, that is, unusable ribbon, is extremely difficult. In the present apparatus, the weight of the sheet metal ribbon 33 in the catenary 51 introduces tensile forces which must be restrained when the operation of the apparatus 30 is terminated. The present invention provides novel second or trailing end gripper means 55 cooperating with the transport means 54 and operable during the tail-out mode, by which the opposite end of the ribbon 33 is moved toward the second ribbon support 41, whereby as the catenary 51 diminishes in length the tensile forces in the ribbon 33 diminish substantially to zero.

During the threading mode, a leading end of the ribbon 33 is introduced through the entry roll means 35, the leveler means 36, over the first ribbon support 37, through the roller-coating means 38 and the shear means 39 to a location just beyhond the shear means 39. If required, the shear means is activated to shear the ribbon 33 thereby to provide a squared leading end. The entry roll means 35 is driven intermittently, that is, jogged to introduce the squared leading end into the first gripper means 54. The squared leading end is then gripped by the first gripper means 54 and the apparatus 30 is ready for the running mode.

During the running mode, the first gripper means 54 is moved by the transport means 53 from a first location $L_1$ (FIG. 1A) to a second location $L_2$ (FIG. 1B) which is beyond the tension control means 46. First connection means 56 provided at the first location $L_1$ facilitates connecting the first gripper means 54 to the transport means 53. First disconnect means 57 provided at the second location $L_2$ facilitates disengagement of the leading end of the ribbon 33 from the first gripper means 54 and facilitates disengagement of the first gripper means 54 from the transport means 53. Second connection means 58 (FIG. 1A) provided at the third location $L_3$ facilitates connecting the second at the third location $L_3$ facilitates connecting the second gripper means 55 to the transport means 53. Second disconnect means 59 provided at the fourth location $L_4$ facilitates disengagement of the ribbon 33 from the second gripper means 55 and disengagement of the second gripper means 55 from the transport means 53.

The first and second gripper means 54, 55 their operation and interaction with the connection means 56, 58 and the disconnect means 57, 59 will hereinafter be described in greater detail.

THE UNCOILER 31

The uncoiler 31 (FIG. 1A) is of conventional construction and is capable of supporting a coil 32 weighing up to 10 tons. The sheet metal ribbon 33 of the coil 32 is pretreated and preprimed; and may have a width of from 16 inches to 48 inches (40.6 to 122 centimeters) and a basic sheet thickness of from 18 gauge to 24 gauge (1.21 to 0.61 millimeters).

The entry ramp 34 is pivoted by piston-and-cylinder means 60 about a pivot connection 61 between lower position 34a to a raised position 34b. In the raised position 34b the entry ramp 34 guides a leading end of the ribbon 33 into the entry roll means 35. Once the entry roll means 35 has gripped the ribbon 33, the entry ramp 34 is lowered to the lower position 34a.

RECOILER 50

The recoiler 50 (FIG. 1B) is of conventional design and incorporates a drive (not illustrated) for recoiling the coated ribbon.

The exit ramp 49 is pivoted by piston-and-cylinder means 62 about a pivot connection 63 between the lowered position illustrated in FIG. 1B and a raised position. In the raised position, the exit ramp 49 guides the ribbon toward and into the recoiler 50.

ENTRY ROLL MEANS 35

Figure 3:
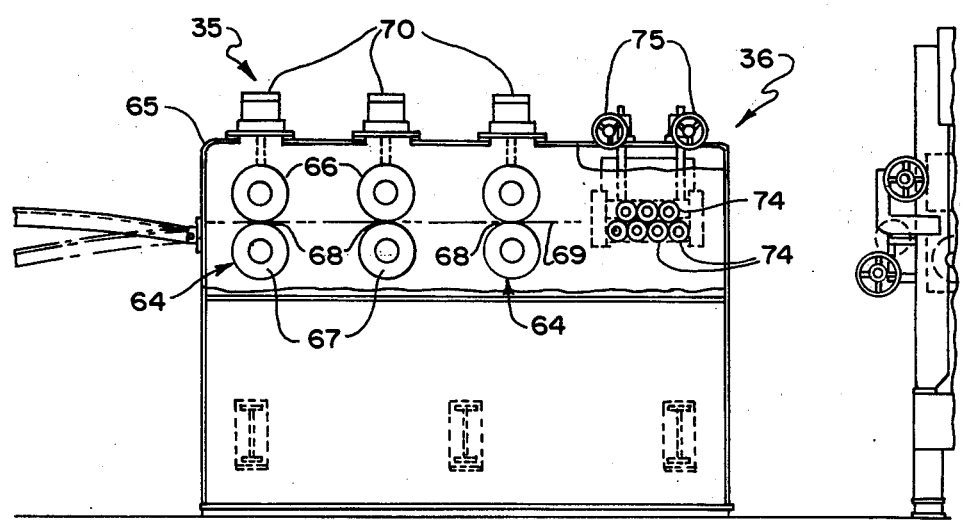
FIG. 3 is a side view of the apparatus of FIG. 2, with portions broken away to show detail.

Referring to FIGS. 2 and 3, the entry roll means 35 preferably comprises pairs 64 of opposed upper and lower entry rolls 66, 67 supported on a frame 65. The rolls 66, 67 are preferably positioned with the nips 68 thereof residing substantially in a common plane 69. The lower rolls 67 are vertically adjustable at their ends by means (not illustrated) to level the same. Motor means 70 provided at each end of each upper roll 66 are operable to urge the opposed rolls 66, 67 of each pair 64 apart to permit introduction of the ribbon 30 therebetween, and thereafter to urge the rolls 66, 67 of each pair 64 together thereby to apply gripping and driving pressure to the ribbon 33. Drive means in the form of motor 71 operating through speed reducer 72 and drive connection 73 drive the entry rolls 66, 67 at a substantially constant angular velocity thereby moving the ribbon 33 at a substantially constant linear speed or line speed.

LEVELER MEANS 36

Referring still to FIGS. 2 and 3, the leveler means 36 comprises plural leveling rolls 74 supported on the frame 65 downstream of the entry roll means 35. The leveler rolls 74 are non-driven and operate to eliminate the coil curvature of the ribbon 33 and render the same essentially flat. Adjustment means 75 sets the gap between the upper and lower leveler rolls 74.

FIRST RIBBON SUPPORT 37

Figure 4:
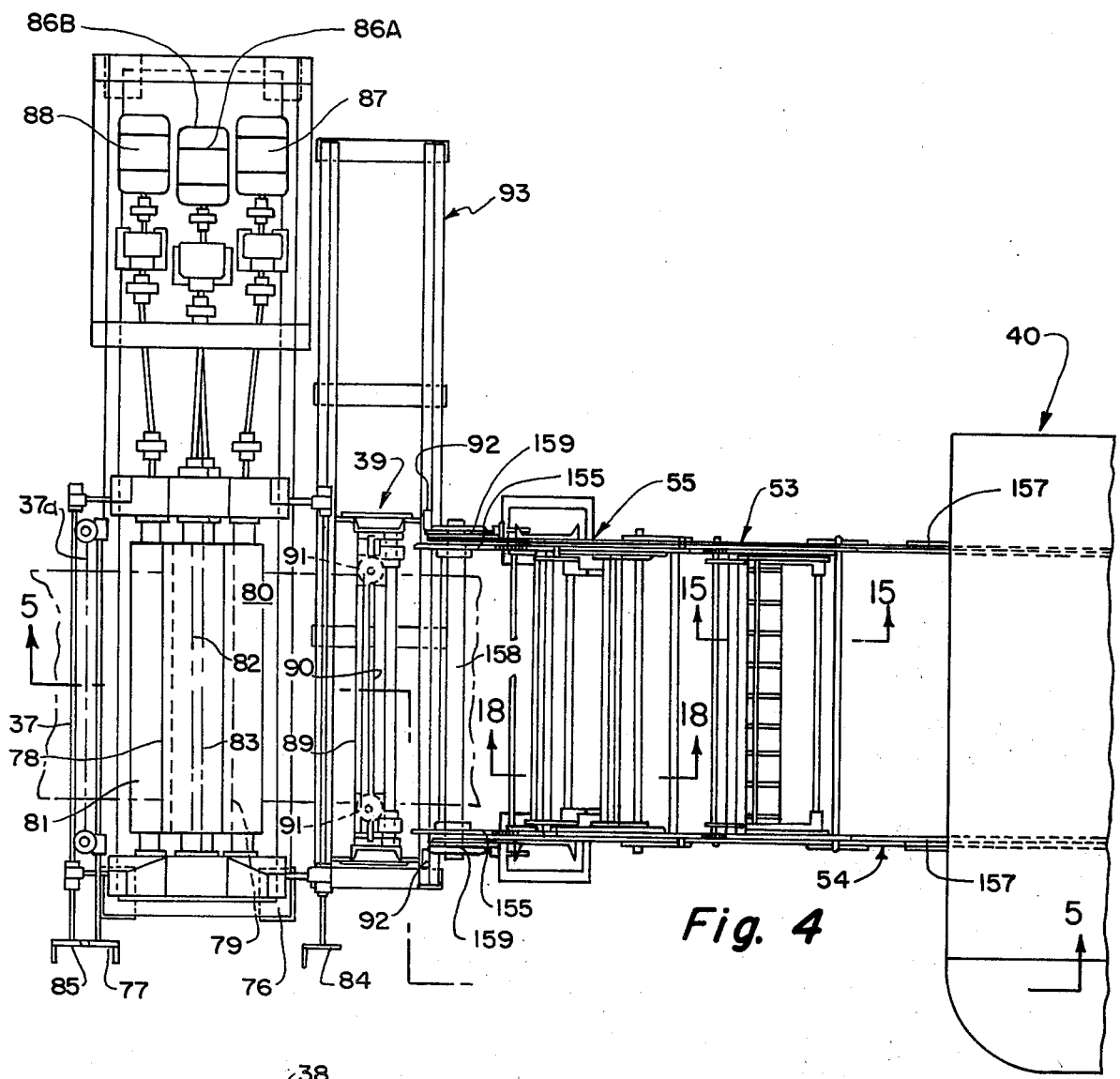
FIG. 4 is a plan view as seen from the line 4—4 of FIG. 1A, illustrating roller-coating means, shear means and first and second gripper means.
Figure 5:
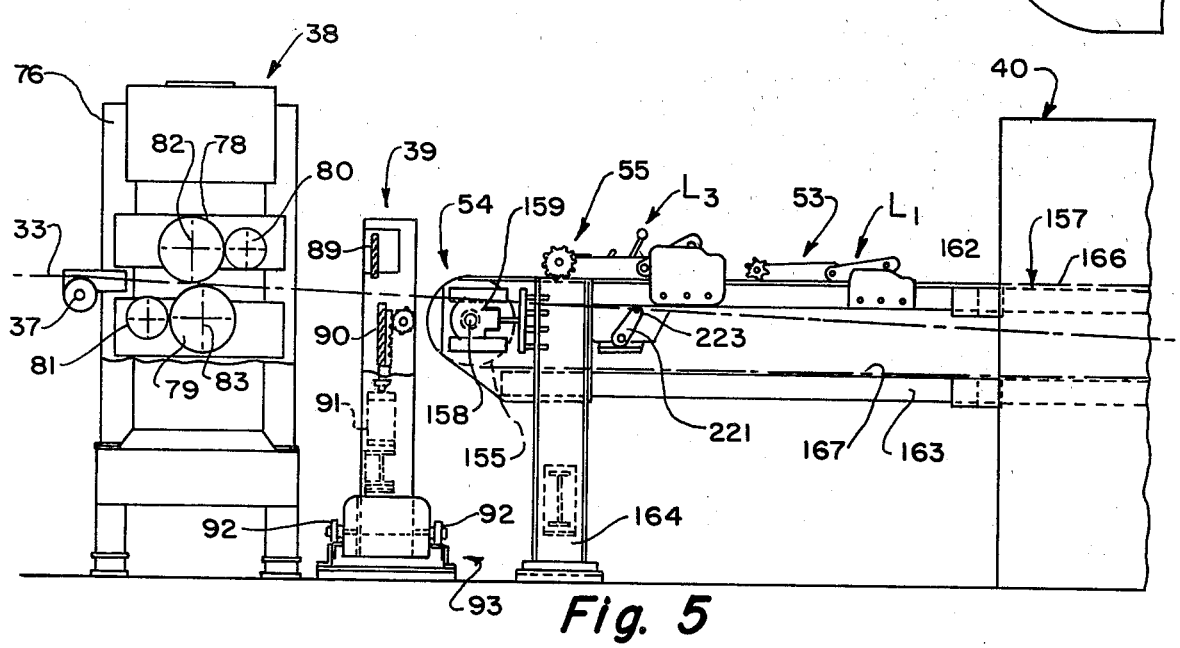
FIG. 5 is a cross-sectional view taken along the line 5—5 of FIG. 4.

Referring to FIGS. 4 and 5, the first ribbon support 37 is mounted on a frame 76 of the roller-coating means 38 for free rotation about a generally horizontal axis 37a (FIG. 4). Adjustment means 77 (FIG. 4) is provided for vertically adjusting the position of the first ribbon support 37 relative to the horizontal.

ROLLER-COATING MEANS 38

Referring still to FIGS. 4 and 5, the roller-coating means 38 comprises upper and lower coating rolls 78, 79 having doctor rolls 80, 81 associated therewith. The upper coating roll 78 has a rotational axis 82 which is offset relative to the axis 83 of the lower coating rolls 79. Coating material (not shown) may be transferred from either or both of the coating rolls 78, 79 onto either or both faces of the ribbon 33. Since the roller-coating means 38 resides in the region of catenary 51, neither of the coating rolls 78, 79 is required to support the ribbon 33. Adjustment means 84 and 85 (FIG. 4) controls the gap between the doctor rolls 80, 81 and the associated coating rolls 78, 79, respectively. The coating rolls 78, 79 may be driven at a constant angular velocity by separate motors 86A, 86B—the motor 86B residing directly below the motor 86A in FIG. 4. The doctor rolls 80, 81 may be driven by separate motors 87, 88, respectively.

SHEAR MEANS 39

Referring still to FIGS. 4 and 5, the shear means 39 includes a stationary upper blade 89 and a movable lower blade 90. The lower blade 90 is driven upwardly during the shearing stroke by suitable motor means 91 provided at each end of the lower blade 90 (FIG. 4). The shear means 39 supported by wheels 92 on track means 93 may be moved laterally out of the pass line.

CURING OVEN 40

Reverting to FIGS. 1A and 1B, the curing oven 40 may comprise a conventional gas-fired or oil-fired curing oven in which the coating applied to the ribbon 33 is cured or dried. The curing oven 40 may provide a one minute cure time at a maximum ambient temperature of 700° F. A peak metal temperature of 475° F. for at least 10 seconds may be achieved.

SECOND RIBBON SUPPORT 41

Referring to FIGS. 6 and 7, the second ribbon support 41 is mounted on a frame 94 for free rotation about a generally horizontal axis 41a. Motor means 95 is provided at each end of the second ribbon support 41 and which is operable to move the second ribbon support 41 between a ribbon supporting position and a lower position shown in dotted outline. The need for the two positions will become apparent later in the specification.

QUENCH MEANS 43

Referring to FIGS. 6 and 7, the quench means 43 comprises upper and lower spray pipes 96, 97 positioned above and below the ribbon 33, which spray a cooling medium such as water directly onto the opposite faces of the ribbon 33. The spray pipes 96, 97 are enclosed within a suitable hood 98 provided with a discharge conduit 99 incorporating, for example, an axial flow exhaust fan 100 for exhausting water vapor from within the hood 98. Liquid water cascading downwardly from the ribbon 33 is collected in the bottom of the hood 98 and directed to a suitable drain.

It will be observed in FIG. 7 that the ribbon 33 extends downwardly from the elevated second ribbon support 41 to the steering means 45. Hence, the cooling water flows along the ribbon 33 in a direction away from the curing oven 40.

DRYER MEANS 44

Referring still to FIGS. 6 and 7, the dryer means 44 may comprise plural chevron-shaped conduits 101 having linear discharge apertures or slots 102 which direct high velocity streams of a drying medium such as air onto the opposite faces of the ribbon 33. Blower means 103 (FIG. 6) introduces pressurized drying air through a transition piece 104 into each of the conduits 101.

STEERING MEANS 45

Referring again to FIGS. 6, 7, and 8, the steering means comprises upper and lower rolls 105, 106, respectively, which are mounted within the hood 98. The lower roll 106 is vertically adjustable at its opposite ends by means (not illustrated) to level the same. Motor means 107 provided at each end of the upper roll 105 are operable to urge the rolls 105, 106 apart to permit introduction of the ribbon 33 and the first gripper means (not illustrated) therebetween, and thereafter to urge the rolls 105, 106 together thereby to apply steering pressure to the ribbon 33.

The steering means 45 includes steering control means 108 (FIGS. 6 and 8) operable in response to sensing devices 109, 110 positioned on opposite sides of the ribbon 33. The steering control means 108 may comprise piston motors 111, 112 secured together in end-to-end relation which pivot the rolls 105, 106 as a unit about their opposite adjacent ends 113 and in the plane of the ribbon 33. The piston motor 111 is secured to a movable plate 114 by a clevis 115. The plate 114 is supported on the frame 94 for reciprocal movement parallel with the direction of movement of the ribbon 33. The piston motor 112 is anchored to the frame 94 by a clevis 116. Four-way valves 117, 118 are supplied, for example, with pressurized air from source 119. The four-way valve 117 communicates pressurized air to the appropriate end of the piston motor 111 in response to guide signals transmitted through a signal line 120 from the sensing device 109. The four-way valve 118 supplies pressurized air to the appropriate ends of the piston motor 112 in response to guide signals transmitted through a signal line 121 from the sensing device 110.

Should the ribbon 33 stray toward the sensing device 109 (FIG. 6), a signal is transmitted through the line 120 to the four-way valve 117 causing the piston motor 111 to pivot the rolls 105, 106 as a unit in a counterclockwise direction about the opposite adjacent ends 113. The ribbon 33 is steered back to a center position whereupon the signal from the sensing device 109 ceases. Should the ribbon 33 stray toward the sensing device 110, a signal is transmitted through the line 121 to the four-way valve 118 causing the piston motor 112 to pivot the rolls 105, 106 as a unit in a clockwise direction about the opposite adjacent ends 113. The ribbon 33 is thus steered back to a center position whereupon the signal from sensing device 110 ceases. The signal devices 109, 110 are supported for horizontal adjustment to match the width of the ribbon 33 being processed.

TENSION CONTROL MEANS 46

Figure 9:
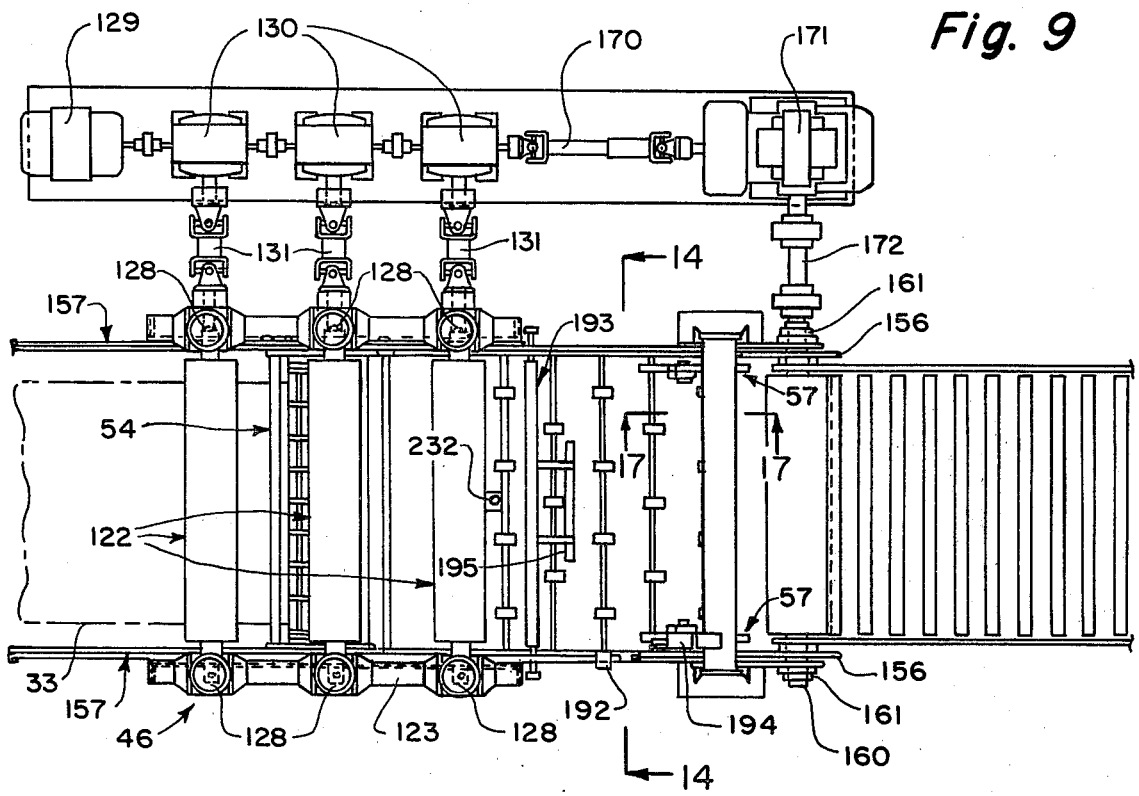
FIG. 9 is a plan view as seen from the line 9—9 of FIG. 1B, illustrating tension control means.
Figure 10:
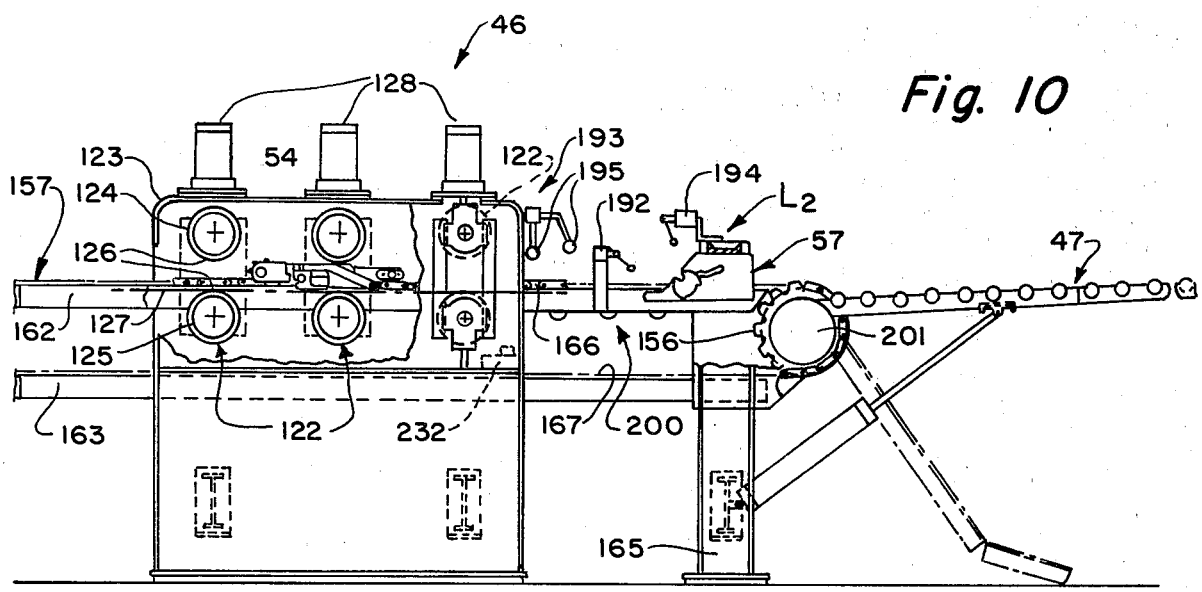
FIG. 10 is a side view of the apparatus of FIG. 9 with portions broken away to show detail.

Referring to FIGS. 9 and 10, the tension control means 46 comprises plural pairs 122 of opposed upper and lower tension rolls 124, 125 supported on a frame 123. The rolls 124, 125 are shown separated in FIG. 10 to illustrate the passage of the first gripper means 54. However it will be appreciated that when closed, the rolls 124, 125 are arranged with the nips 126 thereof residing substantially in a common plane 127. The rolls 125 may be leveled by means not illustrated. Plural motor means 128, one connected to each end of the upper rolls 124, are operable to urge the rolls 124, 125 apart, as illustrated in FIG. 10, to permit passage of the first gripper means 54; and thereafter to urge the rolls 124, 125 together thereby to apply gripping and driving pressure to the ribbon 33. Drive means in the form of motor 129 operating through plural speed reducers 130 and plural drive connections 131, drive the rolls 124, 125 at substantially constant torque, that is in interdependent relation with the entry rolls 66, 67 during the running mode; and at a constant angular velocity corresponding to the line speed during the tail-out mode.

Each of the rolls 124, 125 are provided with a resilient cover, such as a neoprene cover, to promote frictional contact between the rolls 124, 125 and the ribbon 33. The motor means 128 urge the rolls 124, 125 together so as to apply a force of from 60 to 65 pounds per inch (10.7 to 11.6 kilograms per centimeter) of width of the ribbon 33. A gripping force in this range avoids damaging the coating applied to the ribbon 33. Such a pressure range precludes squashing the rubber coatings which would result in loss of radius and hence line speed control, and also precludes "checking" of the flexible covering and premature wearing of the same.

COLLAPSIBLE BRIDGE MEANS 47

Referring to FIGS. 11 and 12, the collapsible bridge means 47 may comprise two bridge sections 132, 133 pivotal about their remote ends by piston motors 134, 135, respectively. The bridge sections 132, 133 when positioned in the flush relation shown in full lines in FIG. 12, guide the ribbon 33 into the tension bridle means 48. During the running mode, the bridge sections 132, 133 are lowered to the position illustrated in dash-dot outline in FIG. 12.

TENSION BRIDLE MEANS 48

Referring to FIGS. 11, 12, and 13, the tension bridle means 48 may comprise three large diameter bridle rolls 136, 137, 138 disposed in vertically staggered relation and rotatably supported on frame members 139. Pressure rolls 140, 141 supported on the frame members 139 are movable vertically by plural motor means 142. The motor means 142 are operable to urge the pressure rolls 140, 141 vertically away from the bridle rolls 136, 138 to allow passage of the ribbon 33 through the tension bridle means 48, and thereafter to urge the pressure rolls 140, 141 toward the bridle rolls 136, 138 thereby to apply a gripping force to the ribbon 33. For the reasons set forth above, the gripping force preferably is in the range of 60 to 65 pounds per inch (10.7 to 11.6 kilograms per centimeter) of width of the ribbon 33.

As best shown in FIG. 12, strip guides 143, 144, 145 are positioned adjacent to the bridle rolls 136, 137, 138, respectively, and cooperate therewith to provide a self-threading feature, that is, to automatically guide the ribbon 33 around the bridle rolls 136, 137, 138 and onto the exit ramp 49. The pressure rolls 140, 141 are operated sequentially and descend into engagement with the ribbon 33, that is, as the ribbon 33 passes beyond the nips of the rolls 136, 140, and as the ribbon 33 passes beyond the nips of the rolls 138, 141.

Referring to FIGS. 11 and 13, the bridle roll 137 has a drive gear 146 connected thereto and meshing with driven gears 147, 148 of the bridle rolls 136, 138. Motor means 149 (FIG. 11) acting through a speed reducer 150, a clutch 151 and a drive connection 152, drives the bridle roll 137 and, in turn, the bridle rolls 136, 138 through the intermeshing gears 146, 147, 148. The bridle rolls 136, 138 have brake means 153, 154, respectively, associated therewith for introducing controlled recoiling tension in that portion of the ribbon 33 (FIG. 1B) which extends between the tension bridle means 48 and the recoiler 50. The overall arrangement of the present apparatus is such that the ribbon 33 is in tension in the region between the entry roll means 35 and the tension control means 46; whereas the ribbon 33 is tension-free in the region between the tension control means 46 and the tension bridle means 48. Thus the recoiling tension is completely segregated from the catenary tension in the present apparatus.

TRANSPORT MEANS 53

Referring to FIGS. 1A and 1B, the transport means 53 comprises, in general, end sprockets 155 (only one visible) positioned adjacent to the shear means 39 and drive sprockets 156 (only one visible) adjacent to the collapsible bridge means 47. The end sprockets 155 (FIGS. 4 and 5) are carried at the opposite ends of an axle 158 which is rotatably supported by bearings 159. The drive sprockets 156 (FIG. 9) are carried at the opposite ends of an axle 160 which is rotatably supported by bearings 161. The end and drive sprockets 155, 156 are carried by support means comprising upper and lower horizontal guide channels 162, 163 which, in turn, are carried by structural supports 164, 165 provided at the opposite ends of the transport means 53. Intermediate of the structural supports 164, 165, the guide channels 162, 163 are supported by the frames of the curing oven 40, the cooling apparatus 42 and the tension control means 46.

Figure 14:
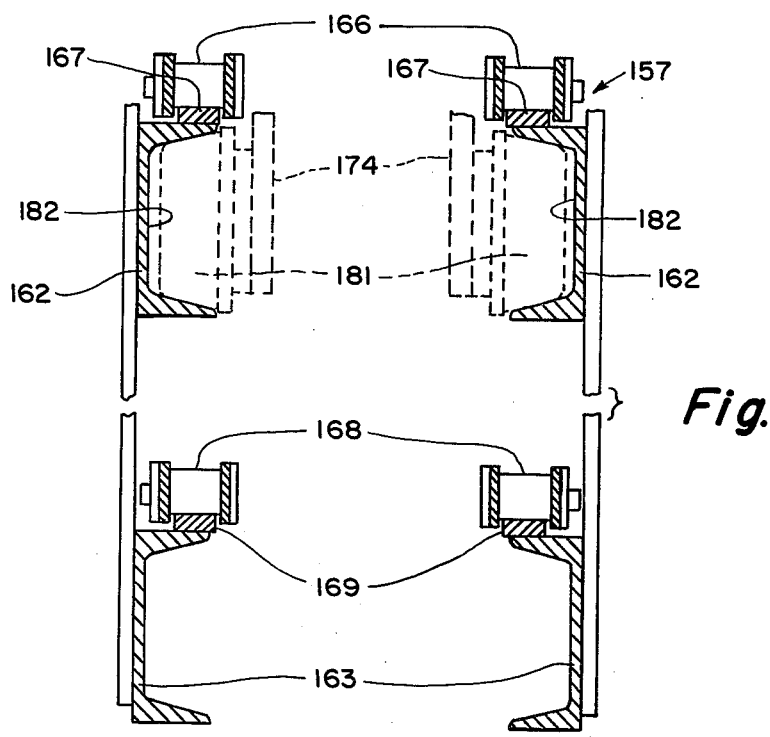
FIG. 14 is a cross-sectional view, taken along the line 14—14 of FIG. 9.

As best shown in FIG. 14, each of the endless chain means 157 presents an upper reach 166 slideably supported on rail blocks 167 secured to the upper guide channel 162; and a lower reach 168 slideably supported on rail blocks 169 secured to the lower guide channel 163. The upper and lower reaches 166, 168 are guided by the rail blocks 167, 169, respectively, during movement thereon in a forward direction as well as in a reverse direction.

It will be observed in FIG. 9 that the drive sprockets 156 and the tension control means 46 are driven by the motor 129. A drive connection 172 extends from the axle 160 to a gear reducer 171 which is driven by the speed reducer 130 through a second drive connection 170.

FIRST GRIPPER MEANS 54

Figure 15:
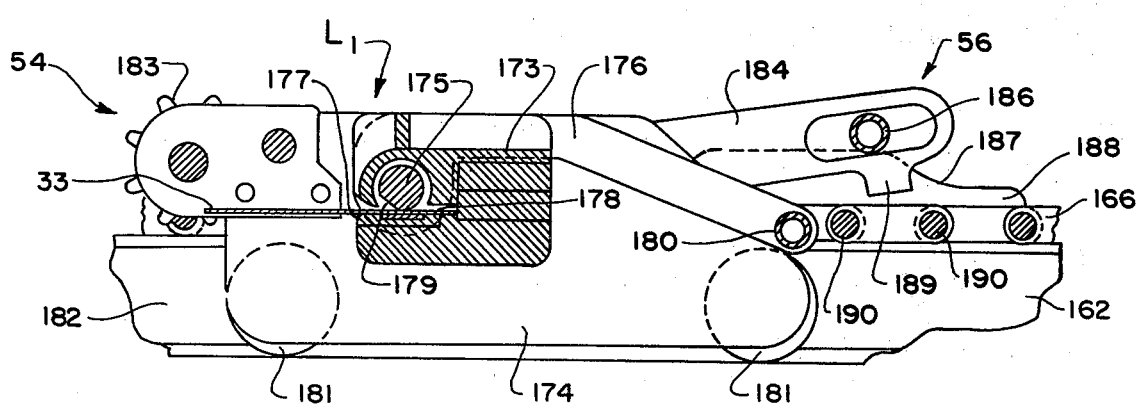
FIG. 15 is a cross-sectional view taken along the line 15—15 of FIG. 4, illustrating first gripper means disposed in a ribbon gripping condition.
Figure 16:
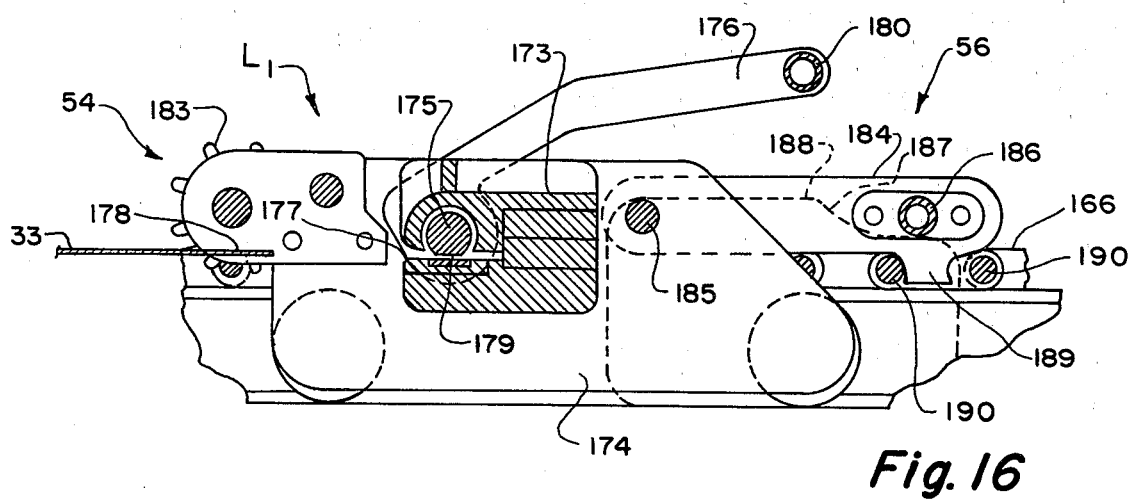
FIG. 16 is a view similar to FIG. 15 illustrating the first gripper means disposed in a leading end receiving condition.

Referring to FIGS. 15 and 16, the first gripper means 54 comprises a body 173 extending transversely between end plates 174. A gripper rod 175 extends through the body 173 and is connected at its opposite ends to arms 176. The remote ends of the arms 176 are connected by a rod 180 which, as will be described, cooperates with the first disconnect means 57 (FIG. 1B) to release leading end of the ribbon 33 from the first gripper means 54. The gripper rod 175 is circular in cross-section and presents a lengthwise flat 179. When the arms 176 are raised from the position of FIG. 15 to the elevated position of FIG. 16, the lengthwise flat 179 confronts and is spaced-apart from a surface 177 of the body 173. The leading end 178 of the ribbon 33 (FIG. 15) may now be introduced between the lengthwise flat 179 and the flat surface 177. As the arms 176 are lowered to the position of FIG. 15, the leading end 178 is firmly gripped. It will also be appreciated that as the first gripper means 54 is moved to the right in FIG. 13 by the transport means 53 the force tending to pull the ribbon 33 from between the gripper rod 175 and the flat surface 177 increases the gripping force. As shown in FIGS. 14 and 15, the side plates 174 rotatably support wheels 181 each having a frustoconical configuration. The wheels 181 extend into and are guided by guiding recesses 182 presented by the upper horizontal guide channels 162.

Referring to FIGS. 15 and 16, the first connection means 56 comprises arms 184, each having one end pivotally connected at 185 to each of the side plates 174. The corresponding opposite ends of the arms 184 are connected by a rod 186. The rods 186 have opposite ends (not visible) which project beyond the arms 184 and engage cam surfaces 187 of cam members 188, each carried by one of the upper guide channels 162. Each of the arms 184 is provided with a lug 189 positioned to be introduced between adjacent rollers 190 of the upper reach 166, in the manner shown in FIG. 16. Each of the side plates 174 is provided with a sprocket 183 which is engaged with the upper reach 166. The sprockets 183 preclude racking or skewing of the first gripper means 54 in the plane of the ribbon 33, when the first gripper means 54 is moved laterally to the right of FIG. 15 to engage the lugs 189 with the rollers 190.

During the threading mode, the leading end of the ribbon 33 (FIG. 1A) is moved through the entry roll means 35 and the leveler means 36, over the first ribbon support 37 and through the roller-coating means 38 to a point just beyond the shear means 39. The leading end of the ribbon 33 is sheared by the shear means 39 to provide a substantially square end. The leading end of the ribbon 33 is then threaded through the second gripper means 55. The first gripper means 54 (FIG. 15) is moved manually or by suitable power means (not illustrated) laterally to the right of FIG. 15 to engage the lugs 189 with the upper reach 166 (FIG. 16). The arms 176 are elevated and the now-square leading end 178 of the ribbon 33 is introduced between the lengthwise flat 179 and the flat surface 177. The arms 176 are lowered to the position illustrated in FIG. 15. The leading end 178 is firmly gripped between the rod 175 and the surface 177.

After the drive motors 71 and 129 (FIGS. 1A and 1B) are activated, the ribbon 33 is impelled over the first ribbon support 37 at a constant speed or line speed while, simultaneously, the first gripper means 54, which is moved by the chain means 157, pulls the leading end of the ribbon 33 in a direction away from the roller-coating means 38 at a preset substantially constant tension and at the same constant speed or line speed. The length of the ribbon 33 beyond the first ribbon support increases continuously as the first gripper means 54 moves from the first location $L_1$ toward the second location $L_2$.

As the first gripper means 54 exits from the steering means 45, sensing device 191 (FIGS. 6 and 8) activates motor means 95 thereby raising the second ribbon support 41 to the elevated running mode position and activates motor means 107 thereby urging the upper roll 105 into engagement with the ribbon 33. The sensing device 191 also activates the quench means 43 causing cooling medium to be sprayed onto the ribbon 33, and the blower 103 (FIG. 6) causing drying air to issue from the linear discharge slots 102.

The first gripper means 54 then passes through the tension control means 46 (FIGS. 9 and 10), that is, between the separated upper and lower tension rolls 124, 125 thereof. On exiting from the tension control means 46, the first gripper means 54 engages a sensing device, such as a first microswitch 192 (FIG. 10) which activates the motor means 128. The upper tension rolls 124 are lowered toward the lower rolls 125 and the ribbon 33 is gripped. At this instance, the catenary 51 (FIGS. 1A and 1B) is established. It should be noted that the tension rolls 124, 125 are driven by the motor means 129 and have a peripheral speed equal to the linear speed of the ribbon 33. When the tension rolls 124, 125 grip the ribbon 33, the ribbon 33 is pulled over the second ribbon support 41 at the same rate at which the entry rolls 66, 67 impel the ribbon 33 over the first ribbon support 37, whereby the catenary 51 is established and maintained during further travel of the first gripper means 54.

As the first gripper means 54 continues to travel toward the second location $L_2$, it encounters the first disconnect means 57 which is operable to disconnect the first gripper means 54 from the chain means 157 and to release the leading end of the ribbon 33 from the first gripper means 54. Knock-down means 193 (FIG. 10) operable by a second sensing device, such as a second microswitch 194 cooperates with the first disconnect means 57 to dislodge the leading end of the ribbon 33 from the first gripper means 54, as will be described. The knock-down means 193 includes bars 195 supported for vertical reciprocal movement into and out of engagement with the ribbon 33.

Figure 17A:
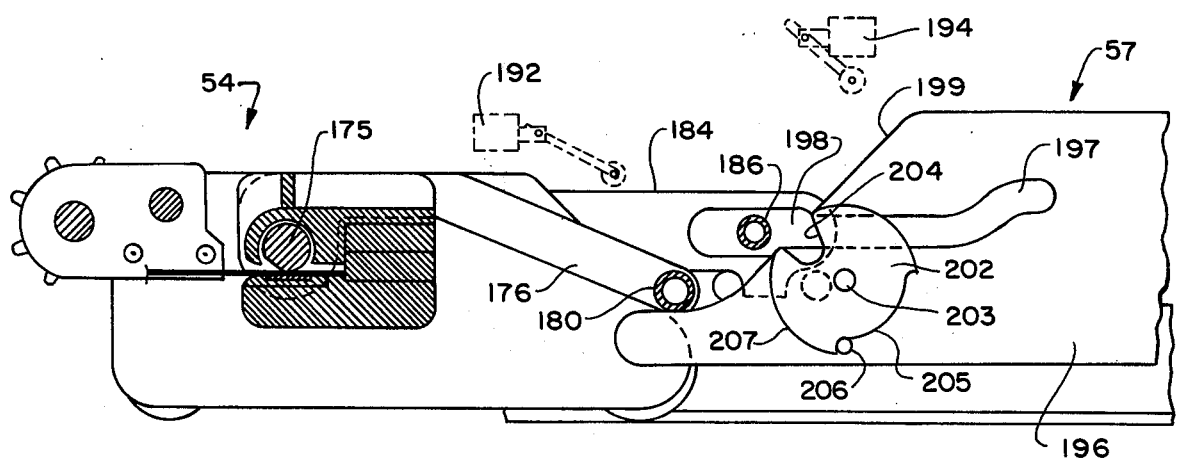
FIGS. 17A, 17B and 17C are cross-sectional views taken in the region of line 17—17 of FIG. 9, illustrating the interaction of the first gripper means with first disconnect means.
Figure 17B:
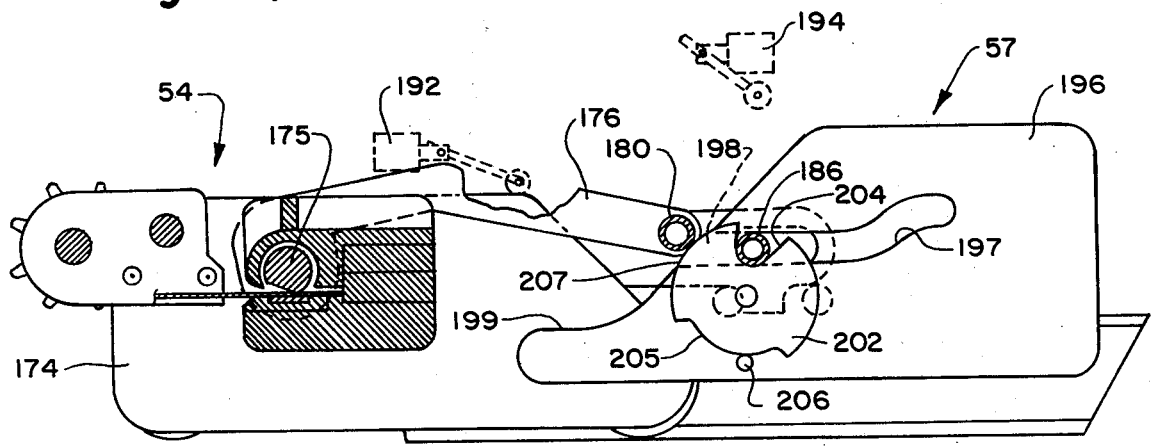
Figure 17C:
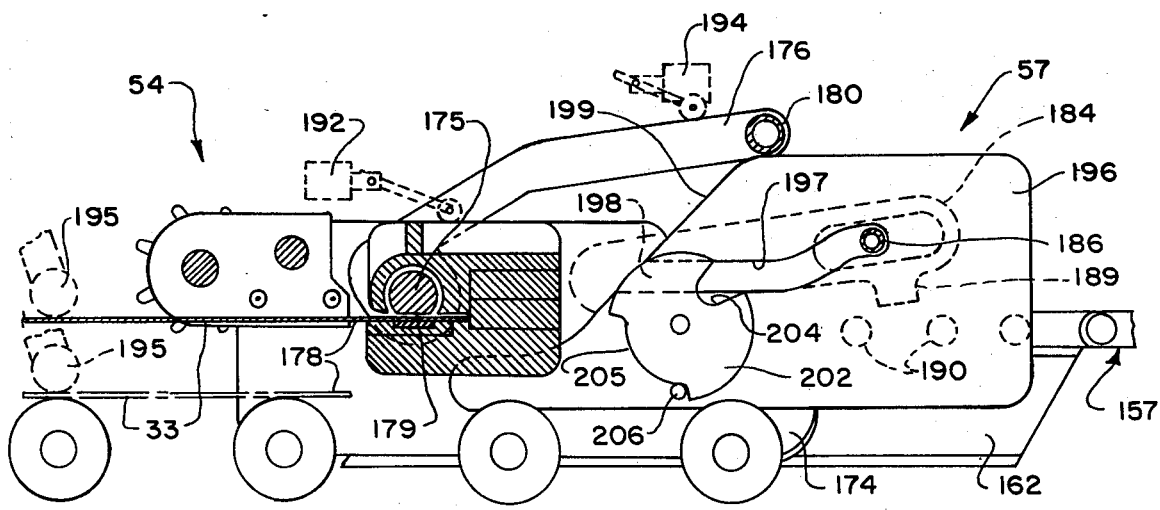

Referring in particular to FIGS. 17A through 17C, the first disconnect means 57 comprises a cam member 196 having a cam slot 197 provided with an entrance opening 198. As the first gripper means 54 approaches the cam member 196, the rod 186 enters the entrance opening 198 and traverses the cam slot 197 thereby elevating the arms 184 and disengaging the lugs 189 from the adjacent rollers 190 of the chain means 157 (FIG. 17C).

The cam member 196 (FIG. 17A) includes a cam surface 199 which when engaged by the rod 180, elevates the arms 176 to rotate the gripper rod 175 counterclockwise. When the first gripper means 54 reaches the position illustrated in FIG. 17C, the leading end 178 of the ribbon 33 is free to be dislodged from the first gripper means 54 by the knock-down means 193.

As the first gripper means 54 approaches the position illustrated in FIG. 17C, the gripper bar arm 176 engages the second microswitch 194 thereby activating the knock-down means 193 (FIG. 10). The knock-down bars 195 (only one shown in FIG. 17C) are lowered, engage the ribbon 33, and dislodge the leading end 178 of the ribbon 33 from the first gripper means 54. The released ribbon 33 travels along suitable conveyor means 200 over an end support roller 201 (FIG. 10) onto the collapsible bridge means 47.

Reverting to FIG. 17A, it will be observed that the entrance opening 198 of the cam slot 197 constitutes a discontinuity in the cam surface 199. To circumvent this discontinuity, the first disconnect means 57 additionally includes a rotary cam member 202 which is rotatably supported at 203 on the cam member 196. The rotary cam member 202 includes a peripheral slot 204 which is initially coincident with the entrance opening 198 and is thereby positioned to receive the rod 186. The rotary cam member 202 additionally includes a peripheral groove 205 which cooperates with a stop member 206 to limit the rotation of the cam member 202 between the positions illustrated in FIGS. 17A and 17C. The rotary cam member 202 additionally includes a peripheral cam surface 207.

The rod 186 (FIG. 17A) enters the entrance slot 198, engages the peripheral slot 204 and rotates the rotary cam member 202 clockwise. The peripheral cam surface 207 (FIG. 17B) bridges the entrance opening 198 thereby eliminating the discontinuity introduced into the cam surface 199 by the entrance opening 198. As the first gripper means 54 moves from the position of FIG. 17B to the position of FIG. 17C, the bar 186 is disengaged from the peripheral slot 204 and continues through the cam slot 197.

SECOND GRIPPER MEANS 55

Figure 18:
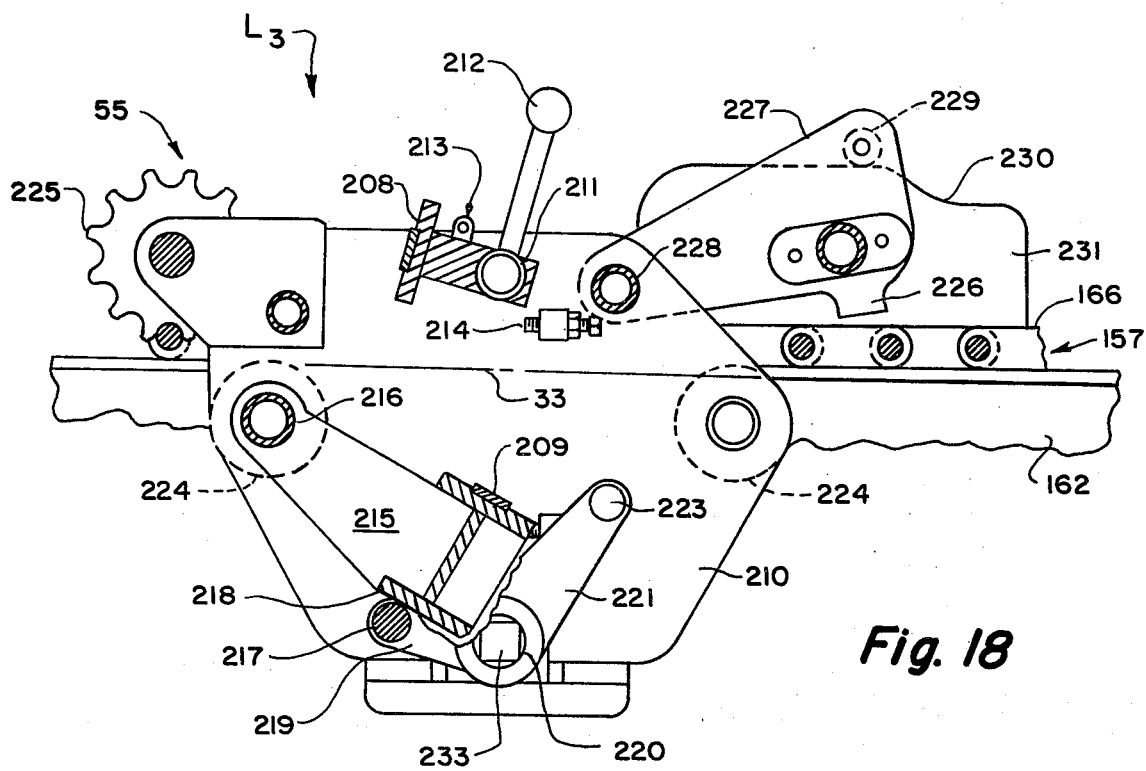
FIG. 18 is a cross-sectional view taken along the line 18—18 of FIG. 4, illustrating second gripper means disposed in a trailing end receiving condition.
Figure 19:
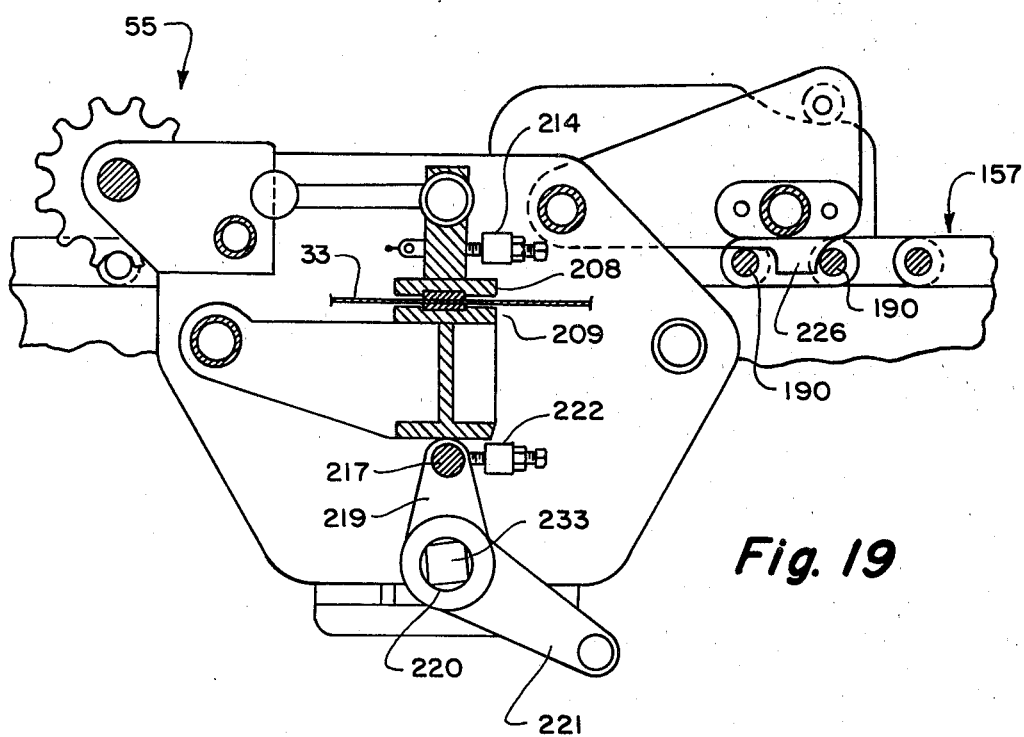
FIG. 19 is a view similar to FIG. 18 illustrating the second gripper means in a ribbon gripping condition.

Referring to FIGS. 18 and 19, the second or trailing end gripper means 55 comprises upper and lower jaw members 208, 209. During the threading and running modes, the jaw members 208, 209 are spaced-apart (FIG. 18) with the ribbon 33 passing therebetween.

The upper jaw member 208 extends between opposite side plates 210 and is rotatably supported thereon by an axle 211. The upper jaw member 208 is rotated by a handle 212 and locked in the elevated position (FIG. 18) by suitable latch means 213. A stop member 214 limits the counterclockwise rotation of the upper jaw member 208 to a vertical position (FIG. 19).

The lower jaw member 209 extends parallel with the upper jaw member 208 and is supported by arms 215. The lever arms 215 are connected to an axle 216 extending between and rotatably secured to the side plates 210. A push rod 217 which engages a lower surface 218 of the jaw member 209 extends between lever arms 219 secured to an axle 220. The axle 220 is provided with a square nut 233 adapted to receive a suitable tool for manually rotating the axle 220 thereby to elevate the lower jaw member 209 to to a gripping position (FIG. 19). A stop member 222 limits the clockwise movement of the lever arm 219. An actuator arm 221 secured to the axle 220 is provided with a roller cam 223 which, as will later be described, cooperates with a cam surface of the second disconnect means 59 (FIG. 1B) to lower the jaw member 209 to a disengaged position (FIG. 18) and thereby release the trailing end of the ribbon 33.

The second gripper means 55 is slideably supported on the upper horizontal guide channels 162 by wheels 224 carried by the side plates 210. Freely rotatably sprockets 225, one carried by each of the side plates 210, engage the upper reach 166 of the chain means 157 and preclude racking or skewing of the second gripper means 155 during movement thereof by the chain means 157.

The second gripper means 55 is connected to the chain means 157 by lugs 226 presented by arms 227 which are pivotally connected as at 228 to the side plates 210. The arms 227 present roller cams 229 which engage cam surfaces 230 of cam members 231 supported by the upper horizontal guide channels 162. The cam surfaces 230 are configured such that as the second gripper means 55 is moved to the right of FIG. 18, the arms 227 are lowered and the lugs 226 are introduced between adjacent rollers 190 of the chain means 157, as shown in FIG. 19.

The tail-out mode is initiated after a desired length of the ribbon 33 has been processed. The "desired length" may correspond to all of the ribbon in the coil 32 (FIG. 1A) or some fraction of the ribbon in the coil 32.

When, for example, the end of the coil 32 is released from the uncoiler 31, the upper jaw member 208 is lowered to the vertical position of FIG. 19. The axle 220 is rotated clockwise to raise the lower jaw member 209 into gripping relation with the ribbon 33, as shown in FIG. 19. Since the ribbon 33 is being pulled by the tension control means 46 (FIG. 1B), the second gripper means 55 also is pulled to the right of FIG. 18. The arms 227 are lowered whereupon the lugs 226 are introduced between the adjacent rollers 190 of the chain means 157. Hence, the second gripper means 55 is moved along with the ribbon 33 at the constant speed or line speed. When the end of the ribbon 33 in the coil 32 is disengaged from the entry roll means 35 (FIG. 1A), the tension in the catenary 51 is immediately transferred to the second gripper means 55. The coated ribbon in the catenary 51 continues through the curing oven 40 until the second gripper means 55 reaches the fourth location $L_4$ (FIG. 1B). It will be appreciated that as the catenary 51 diminishes in length the tensile forces in the ribbon 33 diminish substantially to zero.

Figure 20A:
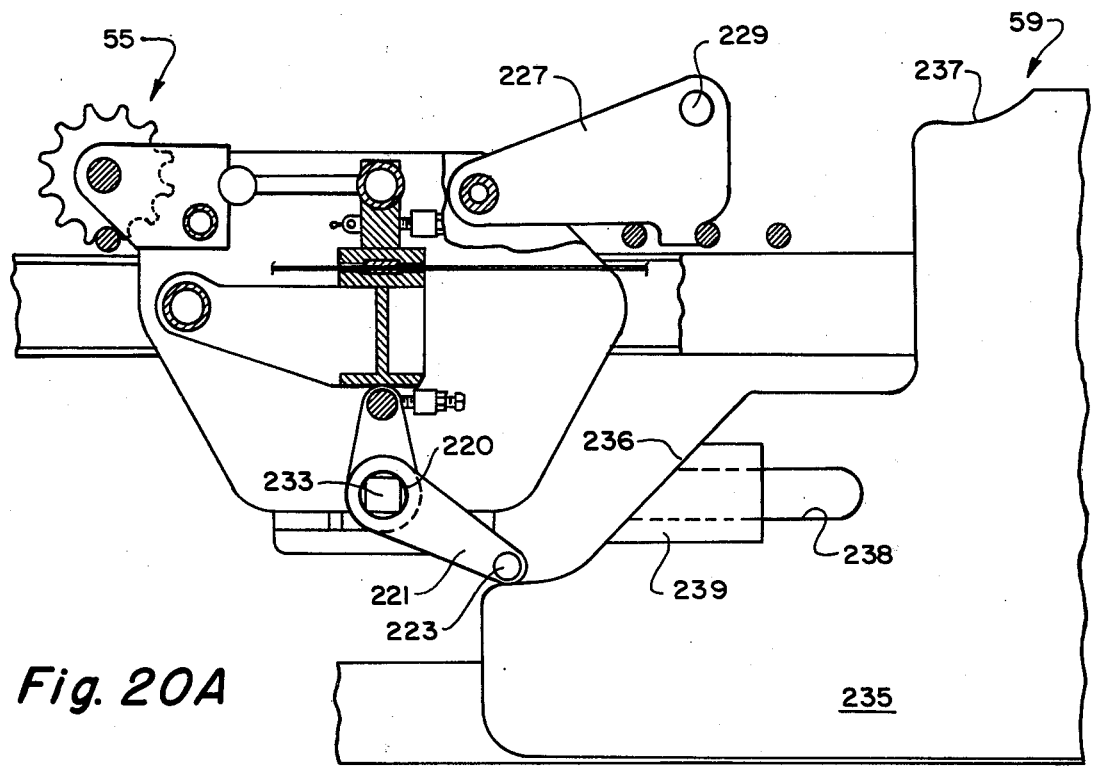
FIGS. 20A and 20B are side views partly in cross-section, taken in the region of the line 20—20 of FIG. 6, illustrating the interaction of the second gripper means with second release means.

The second disconnect means 59 comprises two cam members 235 (FIG. 6) secured to the opposite outer surfaces of the upper and lower guide channels 162, 163. As best shown in FIG. 20A, the cam members 235 include first and second cam surfaces 236 and 237. The cam members also include a slot 238 and a cooperating transition member 239.

Figure 20B:
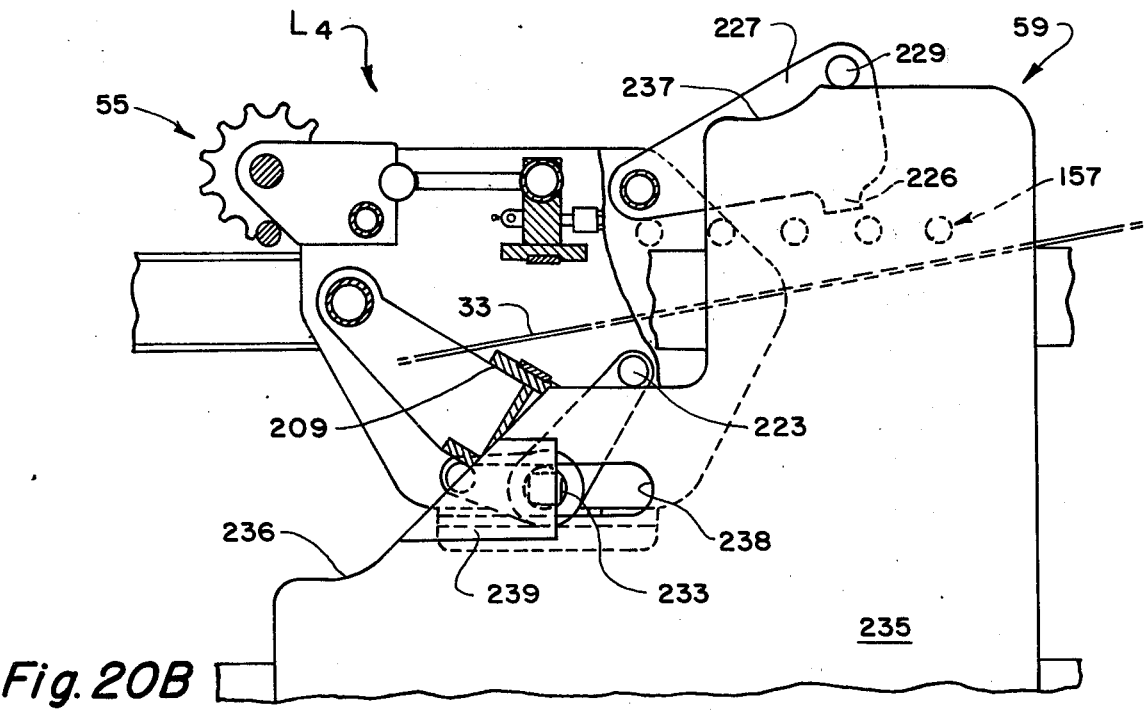

As the second gripper means 55 moves toward the second disconnect means 59 (FIGS. 20A and 20B), the cam roller 223 moves along the first cam surface 236 and over the transition piece 239. The square nut 233 of the axle 220 enters the slot 238. The cam surface 236 causes the actuator arm 221 to be rotated in a counterclockwise direction thereby lowering the lower jaw member 209 as shown in FIG. 20B and releasing the opposite end of the ribbon 33.

Just after the ribbon 33 is released, the roller cams 229 engages the second cam surfaces 237. As shown in FIG. 20B, the arms 227 are elevated and the lugs 226 are disengaged from the chain means 157. The second gripper means 55 comes to rest at the fourth location $L_4$.

Once released, the ribbon 33 (FIG. 7) is pulled by the tension control means 46 over the second ribbon support 41 and through the quench means 43 and the steering means 45. When the trailing end of the ribbon 33 passes the sensing device 191, the second ribbon support 41 is lowered, the upper steering roll 105 is raised and the quench means 43 and the dryer means 44 are shut down. A sensing device, such as a photoelectric sensor 233 (FIGS. 9 and 10), is located beyond the last set of tension rolls 122 and is interconnected with the motor means 128. When the trailing end of the ribbon 33 passes the sensing device 233, the motor means 128 are deactivated and the upper tension rolls 124 move to the raised position illustrated in FIG. 10. The trailing end of the ribbon 33 then travels to the recoiler 50.

MINIMAL WASTE

One object of this invention is to provide apparatus for coating a sheet metal ribbon wherein the manner in which the uncoated sheet metal ribbon is introduced into the apparatus and the manner in which the coated sheet metal ribbon is withdrawn from the apparatus minimizes the length of unusable ribbon. The transport means 53 and the first and second gripper means 54, 55 and their positions relative to the other operating elements results in minimal lengths of unusable ribbon.

In an operating embodiment of the present "strip coating line" 30 as illustrated in FIGS. 1A and 1B, the center-to-center distance 52 between the first and second ribbon supports 37, 41 is about 76.2 feet (23.2 meters)—the length of the catenary 51 being slightly greater than 76.2 feet (distance 52); the center-to-center distance 241 between the entry roll means 35 and the tension control means 46 is about 98.75 feet (30.1 meters); and the center-to-center distance 242 between the uncoiler 31 and the recoiler 50 is about 155.5 feet (47.4 meters). The distance 243 between the location $L_1$ of the first gripper means 54 and the centerline of the roller-coating means 38 is about 9.5 feet (2.9 meters). The distance 243 represents the length of the leading end of the ribbon 33 which remains uncoated during the threading operation. The distance 244 between the third location $L_3$ of the second gripper means 55 and a point upstream of the entry roll means 35 is about 18.5 feet (5.6 meters). The distance 244 corresponds to the coil trailing end of the ribbon 33 which remains uncoated when all of the ribbon in the coil 32 is to be processed. The distance 245 between the third location $L_3$ of the second gripper means 55 and the shear means 39 is about 3 feet (0.9 meters). The distance 245 corresponds to the length of the unusable mid-coil trailing end of the ribbon 33 when less than all of the ribbon in the coil 32 is processed.

In the present apparatus, when all of the coil 32 is to be processed, the total length of unusable ribbon (leading end plus coil trailing end) is about 28 feet (8.5 meters) which corresponds to about 38 percent of the length (distance 52) of the catenary 51 and to about 18 percent of the overall length (distance 242) of the line 30. When less than all of the coil 32 is to be processed, the total length of unusable ribbon (leading end plus mid-coil trailing end) is about 12.5 feet (3.8 meters) which corresponds to about 16.4 percent of the length (distance 52) of the catenary 51 and to about 8 percent of the overall length (distance 242) of the line 30.

OPERATING CONTROLS

Figure 21:
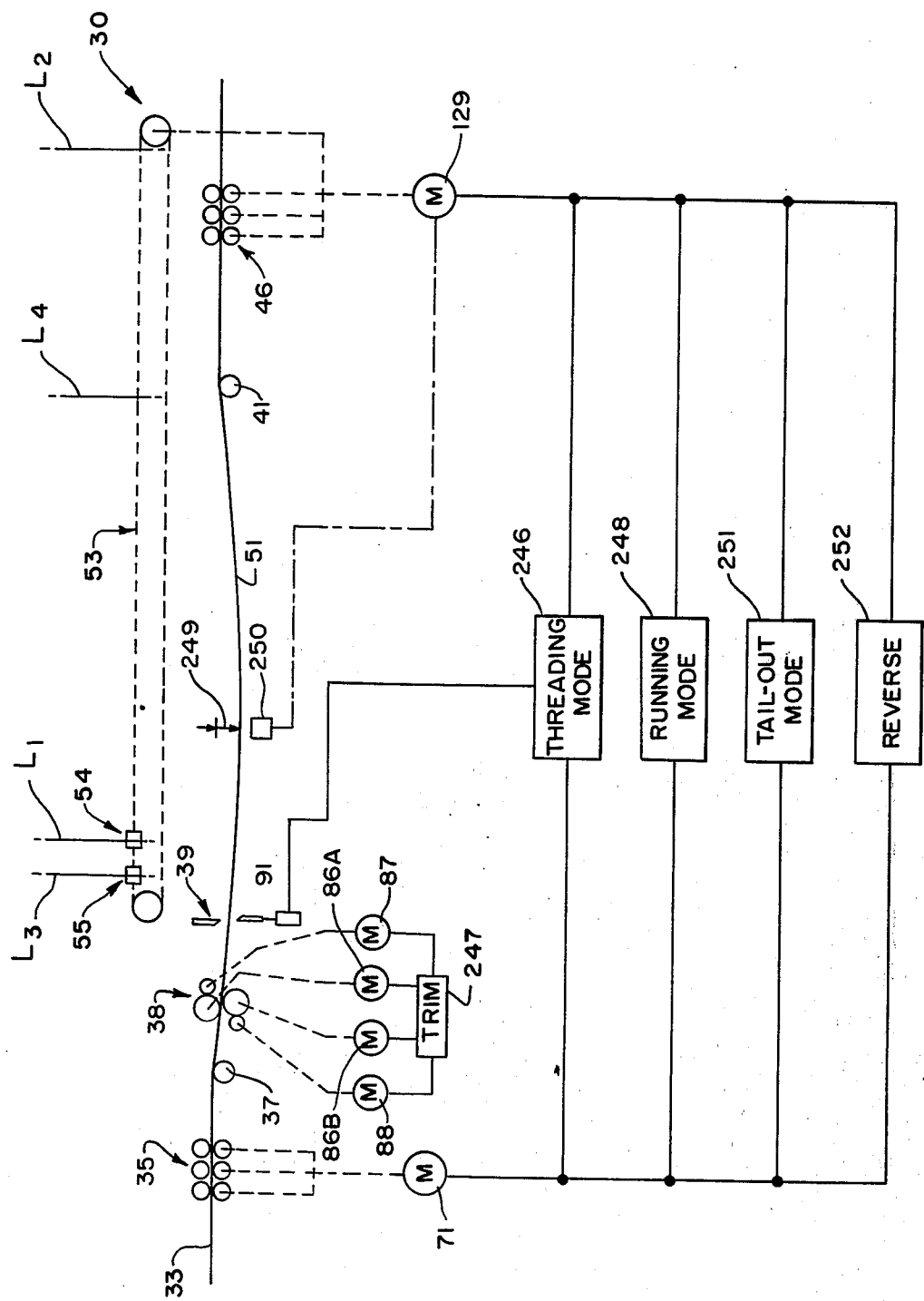
FIG. 21 is a diagram schematically illustrating operating controls for the apparatus of this invention.

Controls for operating the apparatus 30 is schematically illustrated in FIG. 21.

THREADING MODE

The drive motors 71 and 129 and the motor means 91 are operatively connected to suitable control means 246 which controls the intermittent or jogging operation of the entry roll means 35, the transport means 53 and the tension control means 46, and by which the shear means 39 is activated. The control means 246 is arranged such that the drive motors 71, 91 and 129 may be operated independently of each other.

During the threading mode, the leading end of the ribbon 33 is introduced into the entry roll means 35. The drive motor 71 is operated for a length of time sufficient for the entry roll means 35 to impel the ribbon 33 at a relatively slow speed over the first ribbon support 37, through the roller-coating means 38 and the shear means 39 to a position just beyond the shear means 39. If required, the leading end may be squared by activating the motor means 91 of the shear means 39. The now-square leading end is jogged in a forward direction by the entry roll means 35 and is introduced into the first gripper means 54. The leading end is gripped by the first gripper means 54 as explained above. Any slack which may have developed in the ribbon 33 is taken up by jogging the drive motor 129 in a forward direction. The apparatus 30 is now ready to be operated in the running mode.

RUNNING MODE

During the running mode, control of the drive motors 71, 129 is taken over by control means 248 by which the rolls of the entry roll means 35 is driven at a substantially constant angular velocity but by which the transport means 53 and the rolls of the tension control means 46 are driven at substantially constant torque. Suitable trim means 247 also is provided to match the speed at which the motors 86A, 86B, 87 and 88 drive the rolls of the roller coating means 38 to the line speed. The line speed of an operating embodiment of the apparatus 30 has a maximum value of about 50 feet per minute (15.2 meters per minute).

When the running mode commences, the ribbon 33 is impelled over the first ribbon support 37 at line speed, while simultaneously, the leading end of the ribbon and the first gripper means 54 are pulled by the transport means 53 at substantially constant torque. The first gripper means 54 is moved from the first location $L_1$ to the second location $L_2$. When the first gripper means 54 passes between the rolls of the tension control means 46, the upper tension rolls are lowered into gripping relation with the ribbon 33, whereby restraint of the tension in the catenary 51 is transferred from the transport means 53 to the tension control means 46. It should be noted that the tension control means 46 is driven such that the rolls thereof have a rim speed equal to the linear speed (line speed) of the ribbon 33. Hence the processed ribbon 33 is not scuffed or otherwise marred when the tension rolls grip the ribbon 33.

It will be observed in FIG. 21 that when the first gripper means 54 passes over the second ribbon support 41, the ribbon 33 is unsupported between the supports 37, 41 and assumes the shape of a catenary. The tension control means 46, being driven at substantially constant torque, maintains a selected sag indicated at 249 in the catenary 51—the sag 249 corresponding to about 2 feet (0.61 meter) in an operating embodiment of the apparatus 30.

The speed or output torque of the drive motor 129 may be controlled in many ways. In an operating embodiment of the apparatus 30, the speed or output torque of the drive motor 129 is controlled by the current or amperage draw of the drive motor 129 which varies directly with load. That is, when the sag in the catenary 51 is greater than the selected sag 249, the load on the drive motor 129 decreases and hence the amperage draw decreases. Conversely, when the sag in the catenary 51 becomes less than the selected sag 249, the load on the drive motor 129 increases and hence the amperage draw increases. Accordingly, the control means 248 may measure the instantaneous amperage draw value of the drive motor 129. The difference between the measured instantaneous amperage draw values and a selected amperage draw value may be used as a control to vary the speed and hence the output torque of the motor 129.

Alternatively, a sensing device such as a proximity device 250 which senses the instantaneous sag in the catenary may be used as a control to increase or decrease the speed of the motor 129 thereby maintaining the sag of the catenary 51 within specified limits. Other suitable catenary sag control means may be employed.

TAIL-OUT MODE

During the tail-out mode, the drive motor 71 is deactivated and control of the drive motor 129 is taken over by control means 251. The control means 251 operates the tension control means 46 and the transport means 53 at line speed. During the tail-out mode, the second gripper means 55 grips the ribbon 33 at a location downstream of the roller coating means 38 and is moved toward the tension control means 46 by the transport means 53. The arrangement is such that as the catenary 51 diminishes in length, the tensile forces in the ribbon 33 diminish substantially to zero.

The present apparatus 30 also incorporates control means 252 by which the direction of travel of the transport means 53 is reversed, to return the second gripper means 55 from the fourth location $L_4$ to the third location $L_3$ and to return the first gripper means 54 from the second location $L_2$ to the first location $L_1$ in preparation for threading a new leading end through the apparatus.

We claim:

1. In apparatus for threading a sheet metal ribbon along a pass line extending from an uncoiling roll through at least one work station to a recoiling roll to establish and maintain a long-span catenary in said ribbon with significantly reduced waste at the leading end of said ribbon, the combination comprising:
   entry roll means positioned between said uncoiling roll and said work station, operable to impel said ribbon along said pass line toward said recoiling roll at a substantially constant speed;
   a first ribbon support positioned between said entry rolls and said work station for supporting said ribbon;
   a second ribbon support positioned beyond said work station for supporting said ribbon;
   tension control means comprising pairs of opposed tension rolls positioned beyond said second ribbon support, adapted to grip and pull said ribbon along over said second ribbon support, the nips of said tension rolls residing substantially in a common plane;
   gripper means positioned at a first location adjacent to said first ribbon support for gripping said leading end of said sheet metal ribbon;
   transport means operable to move said gripper means and said leading end of said ribbon along said pass line from said first location, through said work station, and between said tension rolls to a second location beyond said tension rolls;
   motor means operable to urge said opposed tension rolls apart to permit passage of said gripper means and said ribbon therebetween, and thereafter to urge said opposed tension rolls together thereby to apply gripping pressure to said ribbon after passage of said gripper means;
   release means at said second location for disengaging said leading end of said ribbon from said gripper means; and
   drive means operable to drive said transport means in interdependent relation with said entry rolls thereby to move said gripper means and said ribbon through said work station at said substantially constant speed until said gripper means passes between said tension rolls and until said tension rolls grip and move said ribbon thereby establishing said catenary, and thereafter to drive said tension rolls in interdependent relation with said entry rolls to maintain a selected sag in said catenary while moving said ribbon through said apparatus at said substantially constant speed.

2. The apparatus of claim 1 wherein said drive means comprises
   first drive means driving said entry roll means at a substantially constant angular velocity; and
   second drive means driving said transport means and said tension control means at a substantially constant torque.

3. The apparatus of claim 1 including shear means for squaring said leading end of said ribbon prior to introducing the same into said gripper means.

4. The apparatus of claim 1 including leveler means for eliminating the coil curvature of said sheet metal ribbon prior to introducing said ribbon into said work station.

5. The apparatus of claim 1 wherein the length of the waste at the leading end of said ribbon is less than the length of said catenary.

6. The apparatus of claim 1 wherein said entry roll means comprises
   pairs of opposed pinch rolls having nips residing substantially in a second common plane.

7. The apparatus of claim 6 wherein said second common plane is substantially parallel with the first said common plane.

8. The apparatus of claim 1 including motor means operable to move said second ribbon support between a ribbon supporting position in the path of travel of said first gripper means and a lower position entirely below the path of travel of said first gripper means.

9. The apparatus of claim 1 wherein said transport means comprises endless chain means.

10. The apparatus of claim 9 including
    connection means at said first location for connecting said first gripper means to said chain means; and
    disconnect means at said second location for disconnecting said first gripper means from said chain means.

11. The apparatus of claim 1 including means for terminating said long-span catenary with significantly reduced waste at a trailing end of said ribbon, comprising:
    second gripper means for gripping said trailing end of said ribbon, said second gripper means being moved by said transport means along said pass line from a third location between said first ribbon support and said first location to a fourth location between said work station and said second ribbon support; and
    second release means at said second position for disengaging said trailing end of said ribbon from said second gripper means;
    said drive means being operable to drive said tension rolls and said transport means thereby to move said second gripper means and said ribbon at said substantially constant speed through said work station to said second position, whereby as said catenary curve diminishes in length the tensile forces in said ribbon diminish substantially to zero.

12. The apparatus of claim 11 wherein the total length of the waste at the leading end and at the trailing end of said ribbon is less than the length of said catenary.

13. The apparatus of claim 11 wherein said second gripper means includes
upper and lower jaws extending transversely of said ribbon, said ribbon passing between said jaws; and
means for moving said jaws into gripping engagement with said ribbon.

14. The apparatus of claim 11 wherein said transport means comprises endless chain means.

15. The apparatus of claim 14 including
first connection means at said first location for connecting said first gripper means to said chain means;
first disconnect means at said second location for disconnecting said first gripper means from said chain means;
second connection means at said third location for connecting said second gripper means to said chain means; and
second disconnect means at said fourth location for disconnecting said second gripper means from said chain means.

16. The sheet movement line of claim 11 including
a tension bridle means positioned downstream of said tension rolls for introducing controlled recoiling tension in that portion of said ribbon extending between said tension bridle means and said recoiling roll;
that portion of said sheet metal ribbon extending between said tension rolls and said tension bridle means being tension free.

17. The apparatus of claim 1 including
a second work station positioned between said first support and said first location of said gripper means, said second work station comprises coating rolls for applying a curable coating to at least one face of said ribbon; and wherein
the first said work station comprises a curing oven for curing said coating.

18. In a sheet movement line wherein a sheet metal ribbon is moved at a substantially constant speed from a supply roll through at least one work station to a recoiling roll, said line including a first ribbon support and a second ribbon support at opposite ends of said work station, said sheet metal ribbon extending between the first and second ribbon supports as a catenary; the improvement in means for maintaining said catenary comprising:
pairs of opposed pinch rolls gripping said ribbon at locations upstream of said first ribbon support;
pairs of opposed tension rolls gripping said ribbon at locations downstream of said second ribbon support, the nips of said opposed tension rolls residing substantially in a common plane; and
drive means driving said tension rolls in interdependent relation with said pinch rolls such that the tension in said ribbon between said pinch rolls and said tension rolls is sufficient to maintain said catenary, said drive means comprising first drive means driving said pinch rolls at a constant angular velocity, and second drive means driving said tension rolls at a substantially constant torque.

19. The sheet movement line of claim 18 wherein the nips of said opposed pinch rolls reside substantially in a common plane.

20. The sheet movement line of claim 18 wherein the common plane of said tension rolls is substantially parallel with the common plane of said pinch rolls.

21. The sheet movement line of claim 18 including
a tension bridle means positioned downstream of said tension rolls for introducing controlled recoiling tension in that portion of said ribbon extending between said tension bridle means and said recoiling roll;
that portion of said sheet metal ribbon extending between said tension rolls and said tension bridle means being tension free.

* * * * *